US009213467B2

(12) United States Patent
Li et al.

(10) Patent No.: US 9,213,467 B2
(45) Date of Patent: Dec. 15, 2015

(54) INTERACTION METHOD AND INTERACTION DEVICE

(71) Applicant: Huawei Technologies Co., Ltd., Shenzhen (CN)

(72) Inventors: Rui Li, Nanjing (CN); Yong Liu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 352 days.

(21) Appl. No.: 13/628,764

(22) Filed: Sep. 27, 2012

(65) Prior Publication Data
US 2013/0268897 A1 Oct. 10, 2013

(30) Foreign Application Priority Data

Dec. 8, 2011 (CN) .......................... 2011 1 0406396

(51) Int. Cl.
*G06F 3/0482* (2013.01)
*G06F 3/0488* (2013.01)
(52) U.S. Cl.
CPC .......... *G06F 3/0482* (2013.01); *G06F 3/04886* (2013.01)
(58) Field of Classification Search
USPC ........................................................ 715/841
See application file for complete search history.

(56) References Cited

U.S. PATENT DOCUMENTS

| 7,210,107 | B2 | 4/2007 | Wecker et al. |
| 7,898,529 | B2 | 3/2011 | Fitzmaurice et al. |
| 7,944,455 | B1 | 5/2011 | Zipnick |
| 2004/0212617 | A1 | 10/2004 | Fitzmaurice et al. |
| 2005/0076309 | A1* | 4/2005 | Goldsmith ................ 715/811 |
| 2005/0140661 | A1 | 6/2005 | Collins |
| 2006/0055789 | A1 | 3/2006 | Jin et al. |
| 2007/0157089 | A1 | 7/2007 | Van Os et al. |

(Continued)

FOREIGN PATENT DOCUMENTS

| CN | 1577232 A | 2/2005 |
| CN | 101263448 A | 9/2008 |

(Continued)

OTHER PUBLICATIONS

Office Action issued in corresponding Chinese Patent Application No. 201110406396.6, mailed May 9, 2013, 23 pages.

(Continued)

*Primary Examiner* — Peiyong Weng
(74) *Attorney, Agent, or Firm* — Brinks Gilson & Lione

(57) ABSTRACT

The present invention provides an interaction device including an interaction interface, where a display area is formed of multiple display boundaries among which a corner area is formed between every two adjacent display boundaries; an interface interaction unit, for generating two first boundaries at a position that is corresponding to at least one corner area in the display area, where the two first boundaries and corner sides display boundaries form a main menu selection area which includes a selectable object; a processing unit, configured to, when the selectable object in the main menu selection area is selected and moves towards a position where any one of the two first boundaries is located and the selected selectable object crosses over a predetermined position, replace the selected selectable object in the main menu selection area with predetermined upper level selectable objects or lower level selectable objects correlated to the selected selectable object.

24 Claims, 23 Drawing Sheets

(56) References Cited

U.S. PATENT DOCUMENTS

| | | |
|---|---|---|
| 2007/0220444 A1 | 9/2007 | Sunday et al. |
| 2007/0247442 A1 | 10/2007 | Andre et al. |
| 2008/0068340 A1 | 3/2008 | Landschaft et al. |
| 2008/0250349 A1* | 10/2008 | Peiro et al. ............. 715/810 |
| 2009/0019397 A1* | 1/2009 | Buffet et al. ............. 715/837 |
| 2009/0058821 A1 | 3/2009 | Chaudhri et al. |
| 2009/0228792 A1 | 9/2009 | Van Os et al. |
| 2009/0228820 A1 | 9/2009 | Kim et al. |
| 2009/0307631 A1 | 12/2009 | Kim et al. |
| 2010/0083190 A1 | 4/2010 | Roberts et al. |
| 2010/0146451 A1* | 6/2010 | Jun-Dong et al. ............ 715/841 |
| 2010/0201636 A1 | 8/2010 | Kikin-Gil |
| 2010/0229125 A1 | 9/2010 | Cha |
| 2010/0241985 A1 | 9/2010 | Kim et al. |
| 2010/0251181 A1 | 9/2010 | Lal |
| 2011/0202838 A1 | 8/2011 | Han et al. |

FOREIGN PATENT DOCUMENTS

| | | |
|---|---|---|
| CN | 101326482 A | 12/2008 |
| CN | 101527745 A | 9/2009 |
| CN | 101630222 A | 1/2010 |
| CN | 101667098 A | 3/2010 |
| CN | 101836182 A | 9/2010 |
| CN | 101853123 A | 10/2010 |
| CN | 102016777 A | 4/2011 |
| CN | 102118514 A | 7/2011 |
| CN | 102203715 A | 9/2011 |
| EP | 1962480 A2 | 8/2008 |
| EP | 1969450 A1 | 9/2008 |
| EP | 2017707 A1 | 1/2009 |
| EP | 2249241 A1 | 11/2010 |
| WO | WO 2011/011121 A2 | 1/2011 |

OTHER PUBLICATIONS

Search Report issued in corresponding Chinese Patent Application No. 201110406396.6, dated Dec. 20, 2012, 23 pages.
Search Report issued in corresponding Chinese Patent Application No. 201110406396.6, mailed Jan. 28, 2013.
Office Action issued in corresponding Chinese Patent Application No. 201110406396.6, mailed Jan. 28, 2013.
International Search Report issued in corresponding PCT Patent Application No. PCT/CN2012/072723, mailed Sep. 20, 2012.

* cited by examiner

INTERACTION METHOD AND INTERACTION DEVICE

CROSS-REFERENCE TO RELATED APPLICATIONS

This application claims priority to Chinese Patent Application No. 20110406396.6, filed on Dec. 8, 2011, which is hereby incorporated by reference in its entireties.

FIELD OF THE INVENTION

The present invention relates to the field of human-machine interaction, and in particular, to an interaction method and an interaction device.

BACKGROUND OF THE INVENTION

With the development of intelligent mobile terminal devices, currently a terminal that performs an interactive operation through a touchscreen occupies the mainstream status of the terminal devices. Such a device may enable a user to perform various interactions with the device through various actions on the touchscreen, such as, switching on/off the device, browsing pictures, listening to music, and watching movies and so on. With the functions of the intelligent terminal device becoming richer and with the advent of a variety of application software, the size of the touchscreen becomes larger and larger. The interaction interface based on the touchscreen also increases in size correspondingly. For a user, when a large screen provides more desirable visual experience, a problem that an inconvenient operation is also caused at the same time. A user usually needs to perform a touch operation across the screen, and such an operational manner usually fails to meet the ergonomic requirements and causes operational inconveniences to a user.

SUMMARY OF THE INVENTION

An embodiment of the present invention provides an interaction device that meets the ergonomic requirements and can be operated conveniently.

The interaction device includes an interaction interface, where the interaction interface includes a display area formed of multiple display boundaries, and among the multiple display boundaries, a corner area is formed between every two adjacent display boundaries. The interaction device further includes an interface interaction unit and a processing unit.

The interface interaction unit is configured to generate two first boundaries at a position that is corresponding to at least one corner area in the display area, where the two first boundaries do not intersect each other in the display area and cross the corner area, respectively, to intersect display boundaries that are at two sides of the corner area, the two first boundaries and the display boundaries that are at the two sides of the corner area form a main menu selection area, and the main menu selection area includes a selectable object.

The processing unit is configured to, when the selectable object in the main menu selection area is selected and moves towards a position where any one of the two first boundaries is located and the selected selectable object crosses over a predetermined position, replace the selected selectable object and a predetermined selectable object at a same level as the selected selectable object in the main menu selection area with predetermined upper level selectable objects or lower level selectable objects correlated to the selected selectable object.

An embodiment of the present invention further provides an interaction method that meets ergonomic requirements and can be operated conveniently, and the method includes:

displaying two first boundaries in a display area, where the display area includes multiple display boundaries, a corner area is formed between every two adjacent display boundaries, the two first boundaries are located at a position that is corresponding to the at least one corner area in the display area, the two first boundaries do not intersect each other in the display area and cross the corner area, respectively, to intersect display boundaries that are at two sides of the corner area, and the two first boundaries and the display boundaries that are at the two sides of the corner area form a main menu selection area;

displaying selectable objects in the display area, where the selectable objects are located in the main menu selection area in the display area;

detecting a first touch action that occurs in the main menu selection area to acquire a position where the first touch action occurs;

determining, according to the acquired position where the first touch action occurs, a selectable object selected by the first touch action;

detecting a first touch track of the first touch action towards a direction of any one of the first boundaries of the main menu selection area; and moving, along the first touch track, the selectable object selected by the first touch action, and when the selectable object selected by the first touch action crosses over a predetermined position, replacing the selectable object selected by the first touch action and predetermined selectable objects at a same level as the selected selectable object with predetermined upper level selectable objects or lower level selectable objects correlated to the selected selectable object.

An embodiment of the present invention further provides an interaction device that meets the ergonomic requirements and can be operated conveniently, which includes:

a first display module, configured to display two first boundaries in a display area; where the display area includes multiple display boundaries, a corner area is formed between every two adjacent display boundaries, the two first boundaries are located at a position that is corresponding to the at least one corner area in the display area, the two first boundaries do not intersect each other in the display area and cross over the corner area, respectively, to intersect display boundaries that are at two sides of the corner area, and the two first boundaries and the display boundaries that are at the two sides of the corner area form a main menu selection area;

a second display module, configured to display selectable objects in the display area, where the selectable objects are located in the main menu selection area in the display area;

a first detection module, configured to detect a first touch action that occurs in the main menu selection area to acquire a position where the first touch action occurs;

a first selection module, configured to determine, according to the acquired position where the first touch action occurs, a selectable object selected by the first touch action;

a first touch track detection module, configured to detect a first touch track of the first touch action towards a direction of any one of the first boundaries of the main menu selection area; and a first object movement module, configured to, move, along the first touch track, the selectable object selected by the first touch action; and when the selectable object selected by the first touch action crosses over a predetermined position, replace the selectable object selected by the first touch action and predetermined selectable objects at a same level as the selected selectable object with predetermined upper level selectable objects or lower level selectable objects correlated to the selected selectable object.

In the interaction device and interaction method provided in the embodiments of the present invention, it is selected to set the main menu at a corner of a display area and present selectable objects in a main menu selection area for selection by a user, and the selectable objects may move, after being selected, in a direction of a first boundary of the main menu selection area, thereby implementing replacement and selection of upper level selectable objects or lower level selectable objects of the selected selectable object, so as to enable a user to perform a simple and fast selection and operation on a target object with a thumb, so that the whole interaction interface, interaction method, and interaction device meet the ergonomic design requirements, and it is convenient for a user to implement a simple, easy, and fast interactive operation through the interaction interface, interaction method and interaction device.

DETAILED DESCRIPTION OF THE EMBODIMENTS

Figure 1:
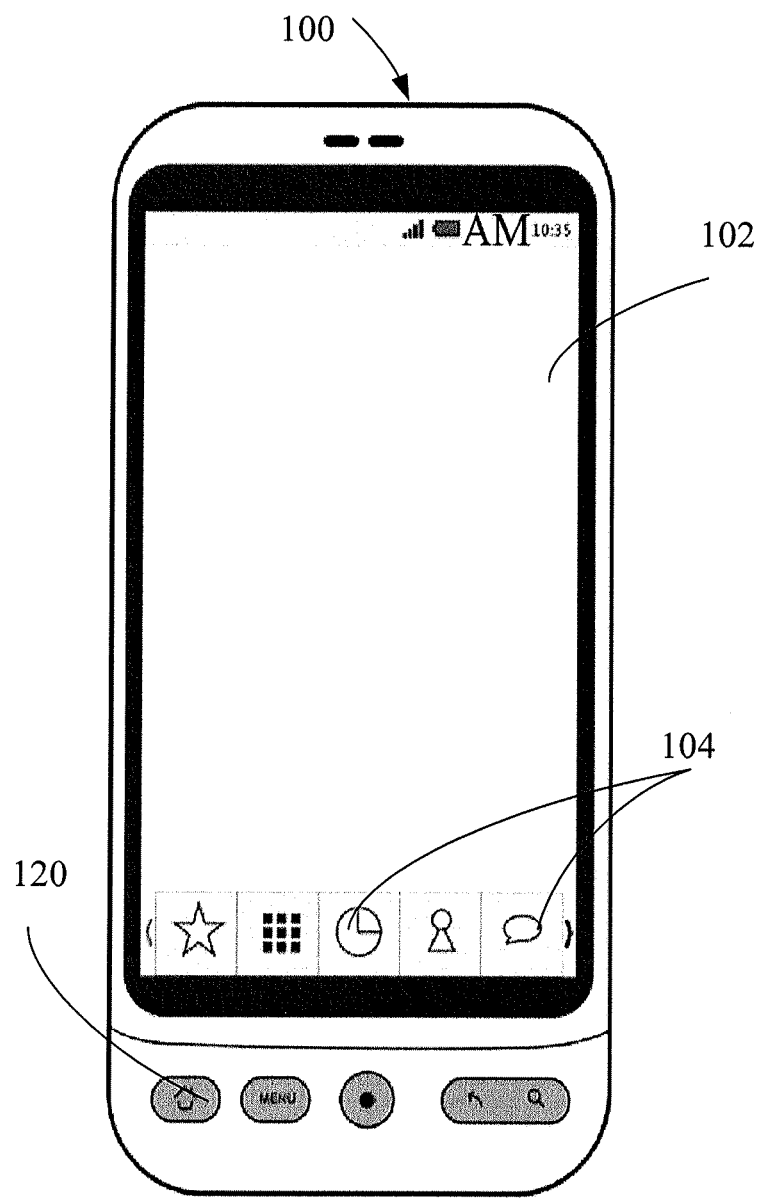
FIG. 1 is a block diagram of an interaction device that bears and implements the present invention.

Referring to FIG. 1, FIG. 1 is a block diagram of an interaction device 100 for bearing and implementing the present invention. The interaction device 100 may be a data processing device such as a tablet computer, a personal digital assistant, a cellular phone, a network appliance, a camera, a smart phone, an enhanced general packet radio service (EGPRS) mobile phone, a network base station, a media player, a navigation device, an E-mail device, a game control station, a digital photo frame, and a data card, or a combination of any two or more of these data processing devices or other data processing devices.

The interaction device 100 includes a touch-sensitive display 102. The touch-sensitive display 102 may use the liquid crystal display (LCD) technology, the light emitting diode (LED) technology, the carbon nanotube display or some other display technologies. The touch-sensitive display 102 may be a device that is sensitive to touch and/or tactus of a user and integrates a display and touch responses. The touch-sensitive display 102 may include a multi-point touch-sensitive response function. The multi-point touch-sensitive response refers to that the touch-sensitive display 102 may process multiple synchronous touch points, which includes processing of data related to the pressure, area and/or position of each touch point. Such a multi-point touch function may facilitate the interaction with the interaction device 100 by using the gestures or actions of multiple fingers. The interaction device 100 may display one or more graphical user interfaces on the touch-sensitive display 102, so as to provide a user with access to various system objects and convey information to the user. The graphical user interface may include one or more selectable objects, that is, display objects. The display object provides a user in a graphical manner with a port of starting a certain function, and the selectable objects include device functions, applications, windows, files, alarms, events or other recognizable system objects.

The interaction device 100 may implement the functions of multiple devices such as a telephone device, an E-mail device, a network data communication device, a Wi-Fi base station device and a media processing device. In some implementations, specific display objects may be displayed at a menu bar of a user interface. In some implementations, the device function may be accessed from a top-layer graphical user interface. For example, a function corresponding to the device is invoked in a touch manner.

In some scenarios, after a certain device function of the interaction device 100 is invoked, the graphical user interface of the interaction device 100 is changed or enlarged or replaced with another user interface or user interface element, so as to assist a user in performing the access and operation of a specific function that is correlated to the corresponding device function. For example, in response to a telephone object touched by a user, a graphical user interface of the touch-sensitive display 102 may present display objects related to various telephone functions. Similarly, by touching an E-mail object, the graphical user interface may be enabled to present display objects related to various E-mail functions. By touching a network object, the graphical user interface may be enabled to present display objects related to the webpage browsing function. By touching a media player object, the graphical user interface may be enabled to present display objects related to various media processing functions.

In some other scenarios, the environment or state of the top-layer graphical user interface in FIG. 1 may be restored by pressing a button 120 that is located near a bottom of the interaction device 100. In some other scenarios, each corresponding device function may have a corresponding "main interface" display object that is displayed on the touch-sensitive display 102, and the environment of the graphical user interface in FIG. 1 may be restored by pressing the "main interface" display object. In some other scenarios, the top-layer graphical user interface of the interaction device 100 may include other display objects 106, for example, a short message service (SMS) object, a calendar object, a photo object, a camera object, a calculator object, a stock object, a weather object, a map object, a note object, a clock object, an address book object and a setting object. By touching a map object, for example, the map drawing and position-based service environment and support function may be invoked.

Figure 2:
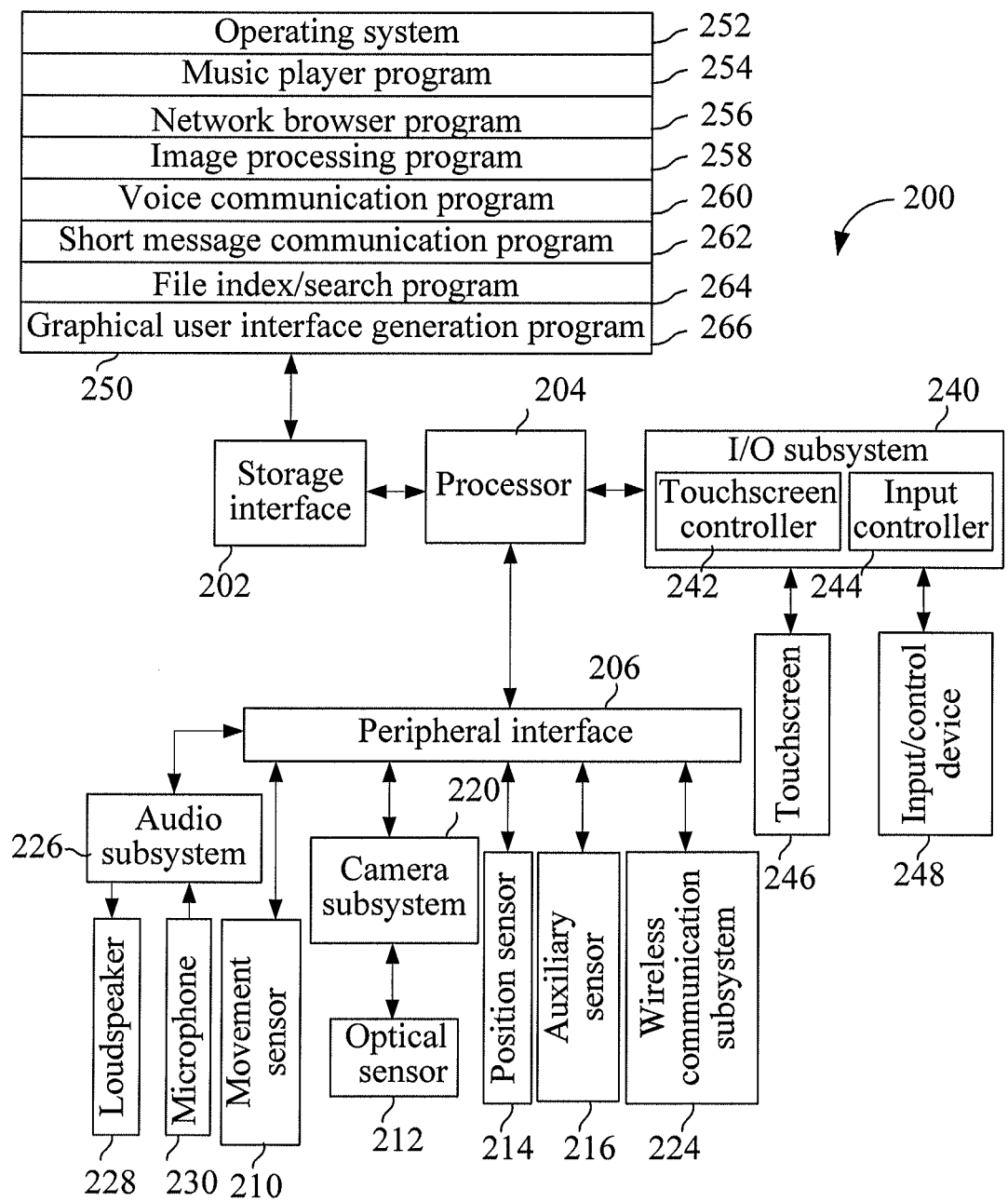
FIG. 2 is a block diagram of a system architecture of an interaction device 100 in FIG. 1.

Similarly, by selecting one random display object 106, the corresponding object environment and function may be invoked. Referring to FIG. 2, FIG. 2 shows the system architecture 200 of the interaction device 100 in FIG. 1. The system architecture 200 of the interaction device 100 may include a memory interface 202, one or more data processors, a graphic processor and/or a central processing unit 204 and a peripheral interface 206. The memory interface 202, one or more processors 204 and/or peripheral interface 206 may be discrete components or may be integrated into one or more integrated circuits. All components of the system architecture 200 may be connected by using one or more communication buses or signal cables. A sensor, a device and a subsystem may be connected to the peripheral interface 206 to assist the implementation of various functions of the interaction device. For example, a movement sensor 210, an optical sensor 212 and a position sensor 214 may be connected to the peripheral interface 206 to assist the implementation of the related movement sensing function, environment brightness sensing function and position sensing function of the interaction device, and may also coordinate with each other to accomplish a specific function. Other auxiliary sensors 216 may also be connected to the peripheral interface 206, for example, a positioning system (for example, a GPS receiver), a temperature sensor, a biometric sensor, atmospheric pressure sensor, and an altitude sensor, to assist in accomplishing the various related functions of the interaction device. The system architecture 200 of the interaction device 100 further includes a camera subsystem 220. The camera subsystem 220 assists the camera subsystem through an optical sensor 212 such as a charge-coupled device CCD or a complementary metal-oxide-semiconductor CMOS optical sensor in implementing corresponding graphic acquisition function. The system architecture 200 of the interaction device 100 further includes a wireless communication subsystem 224. The wireless communication subsystem 224 is configured to enable the interaction device to have a wireless communication function. The wireless communication subsystem 224 may include a radio frequency receiver and transmitter and/or optical (for example, infrared) receiver and transmitter. The system architecture of the interaction device 100 further includes an audio subsystem 226. The audio subsystem 226 is configured to implement sound capturing or audio signal play function of the interaction device. The audio subsystem 226 includes a loudspeaker 228 and a microphone 230 to assist the implementation of the voice capturing and audio signal play function. The system architecture of the interaction device 100 further includes an I/O subsystem 240. The I/O subsystem 240 is configured to enable the interaction device 100 to implement input and output control. The I/O subsystem 240 may include a touchscreen controller 242 and/or other (one or more) input controllers 244. The touchscreen controller 242 may be connected to the touchscreen 246. The touchscreen 246 and the touchscreen controller 242 may use any one of multiple touch-sensitive technologies to detect a touch and movement or interruption of the touch. The touch technology includes, but is not limited to, capacitive, resistive, infrared and surface acoustic wave technologies and is used for utilizing the touchscreen 246 to implement other close sensing arrays or other elements for determining one or more touch points. The input controller 244 may be connected to other input/control devices 248. The other input/control devices 248 may be one or more buttons, toggle switches, thumb rotary switches, infrared ports, USB ports and/or tapping and selection devices such as styli. In addition, the touchscreen 246 may also be used to present a virtual button and/or keyboard, so as to implement input control of the interaction device. The memory interface 202 of the system architecture 200 of the interaction device 100 may be connected to a memory 250. The memory 250 may be a high speed random access memory and/or a nonvolatile memory, for example, one or more disk storage devices, one or more optical storage devices and/or flash memory. The memory may store an operating system 252. The operate system 252 may include instructions for processing basic system services and for executing hardware dependent tasks. The memory 250 may further store multiple executable programs. The executable program may be a music player program 254, a network browser program 256, a graphic processing program 258, a voice communication program 260, a short message communication program 262, a file index/search program 264, a graphical user interface generation program 266 or other applications programs having various functions.

The above introduces an exemplary interaction device 100 and the system architecture of the interaction device of the interaction interface and the interaction method that bear the present invention. The following introduces the specific embodiments of the present invention based on the above exemplary interaction device 100.

Figure 3:
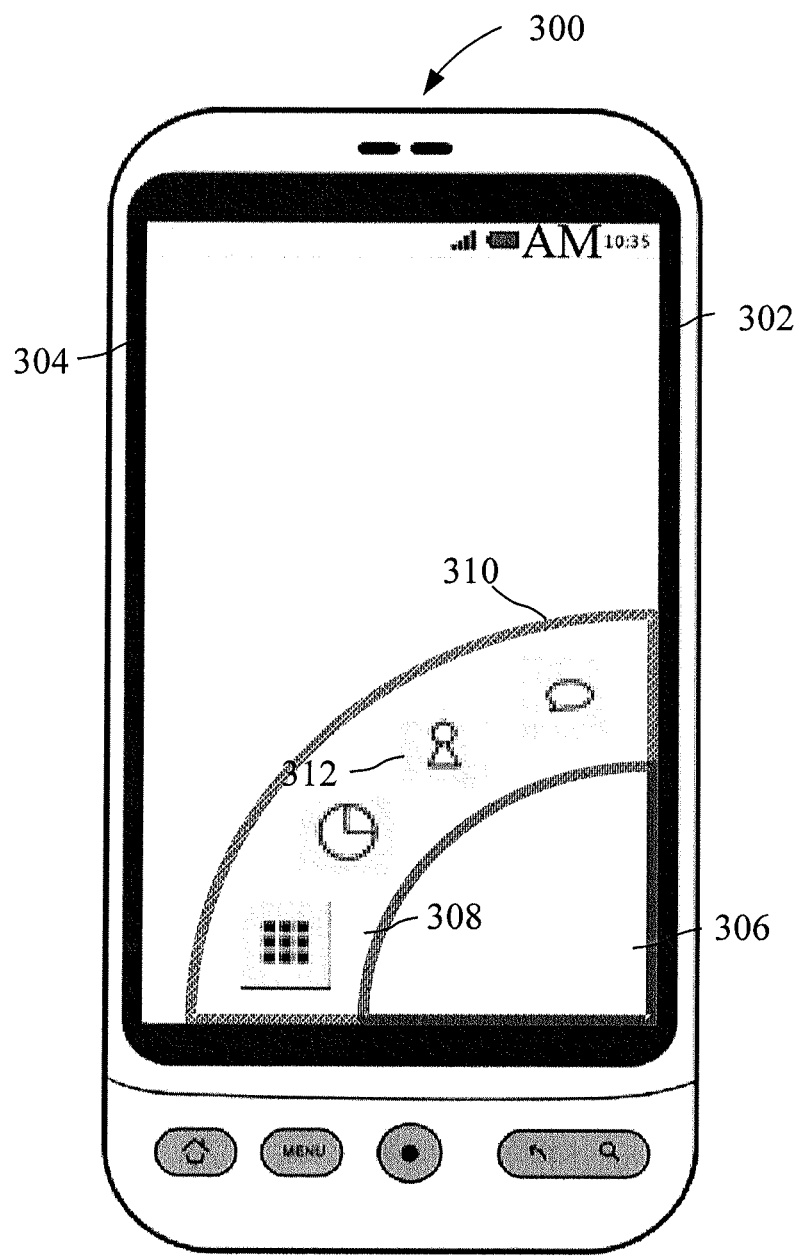
FIGS. 3, 3A, and 3B show an interaction interface and an interaction manner according to an embodiment of the present invention.

Referring to FIG. 3, FIG. 3 shows an interaction interface 300 of an interaction device 100 according to an embodiment of the present invention. The interaction interface 300 may be generated by the central processing unit 204 invoking the graphical user interface generation program 266. The interaction interface 300 is configured to present objects various system functions and/or application functions of the interaction device 100 to a user in a manner of visual. The system functions or application functions include, but are not limited to, the functions of the various programs stored in the memory 250. It may be understood that, the interaction device 100 in the present invention may implement the generation of the interaction interface 300 through a combination of the one or more physical elements and one or more executable programs and may implement the interaction between the interaction device 100 and the user through the interaction interface 300. The participation timing and execution timing of the various physical elements and executable programs may be different according to different combinations of physical elements and combinations of executable programs, which are not specifically limited in the embodiment of the present invention. In addition, the various physical elements and executable programs that participate in the generation of the interaction interface 300 and the implementation of the interaction between the interaction interface 300 and the interaction device 100 may be different according to different design schemes, which are not specifically limited in the embodiment of the present invention, neither. For convenience of the introduction of the technical solution in the embodiment of the present invention, the physical elements, executable programs or combinations of physical elements and executable programs that participate in the implementation of the generation of the interaction interface 300 are generally defined as interface interaction units, and physical elements, executable programs or combinations of physical elements and executable programs that implement the interaction with the interaction device 100 through the interaction interface 300 are generally defined as processing units.

The interaction interface 300 of the present invention includes a display area 304 formed of multiple display boundaries 302, where among the multiple display boundaries 302, a corner area 306 is generated between adjacent display boundaries 302. The interface interaction unit is configured to generate two first boundaries 310 at a position that is corresponding to at least one corner area 306 in the display area 304, where the two first boundaries 310 do not intersect each other in the display area 304 and cross the corner area 306, respectively, to intersect the display boundaries 302 that are at two sides of the corner area 306. The two first boundaries 310 and the display boundaries 302 at the two sides of the corner area 306 form a main menu selection area 308. The main menu selection area 308 includes a selectable object 312. The processing unit is configured to, when the selectable object 312 is selected and moves towards a position where any one of the two first boundaries 310 of the main menu selection area 308 is located and the selected selectable object 312 crosses over a predetermined position, replace the selected selectable object 312 in the main menu selection area 308 and a predetermined selectable object at a same level as the selected selectable object 312 with predetermined upper level selectable objects 316 or lower level selectable objects 318 correlated to the selected selectable object 312.

The display area 304 is all or a part of the interaction interface 300. According to different use manners and design manners, in some scenarios, the interaction interface 300 may be completely used for presenting graphical display objects, and at this time, the display boundary 302 of the display area 304 is a boundary of the interaction interface 300. For example, in some scenarios, the boundary of the interaction interface 300 is an edge of the touchscreen, and at this time, the boundary of the display area 304 is an edge of the touchscreen. In some other scenarios, a part of the interaction interface 300 is used for presenting graphical display objects, and the other part is used as an operation area, such as a character input keyboard or a telephone number dial key, and at this time, the display area 304 only occupies a part of the interaction interface 300, while the display area 304 is an area enclosed by a straight line that is defined along a horizontal axis and a vertical axis of the interaction interface 300 or by a curve-shaped display boundary 302. Generally, the display area 304 includes a limited number of display boundaries 302, for example, a rectangle includes 4 display boundaries 302, or a triangle includes three boundaries 302, or a polygon includes five or six display boundaries 302. In this case, the corner area 306 is generated between the adjacent display boundaries 302. Generally, to make the display content and display manner of the display area 304 meet the ergonomics, the display area 304 is a rectangle including 4 display boundaries 302, and the display area 304 and the interaction interface 300 overlap at the bottom boundary. When the display area 304 and the interaction interface 300 overlap at the bottom boundary, the corner area 306 between adjacent two display boundaries 302 of the display area 304 is a position that may be touched most easily when a user performs an operation with a thumb, and the main menu selection area 308 is set at this position, thus bringing great conveniences for the operation of the user. That is, the main menu selection area 308 is generated at a lower right corner or a lower left corner of the display area 304 for a user to perform an operation on a selectable object 314 in the main menu 308 with a thumb. Such a practical manner fairly meets the ergonomic design for users. For a user, the position of the main menu selection area 308 can be acquired and operated more easily, thereby avoiding physical fatigues and damages of the users due to a long term operation. Optionally, the display area 304 may be set at will according to the individual use habits and preferences.

The main menu selection area 308 is generated in the corner area 306. The main menu selection area 308 is used for showing a user multiple objects to be selected in a graphical manner. That is, the main menu selection area 308 includes a selectable object 312. In a scenario, the main menu selection area 308 may be in a strip shape, that is, the main menu selection area 308 includes two first boundaries 310, and the two first boundaries 310 of the main menu selection area 308 do not intersect each other in the display area 304 and cross the corner area 306, respectively, to intersect the display boundaries 302 that are at the two sides of the corner area 306. The two first boundaries 310 and the display boundaries 302 intersecting the two first boundaries 310 form the main menu selection area 308. Optionally, the first boundary 310 may be in a straight line shape or in a curved shape, and for the curved shape, an arc shape is an exemplary implementation. It may be understood that, the main menu selection area 308 may also be set to various specific shapes such as a step shape or a spiral shape according to the use preferences of a user.

Figure 3A:
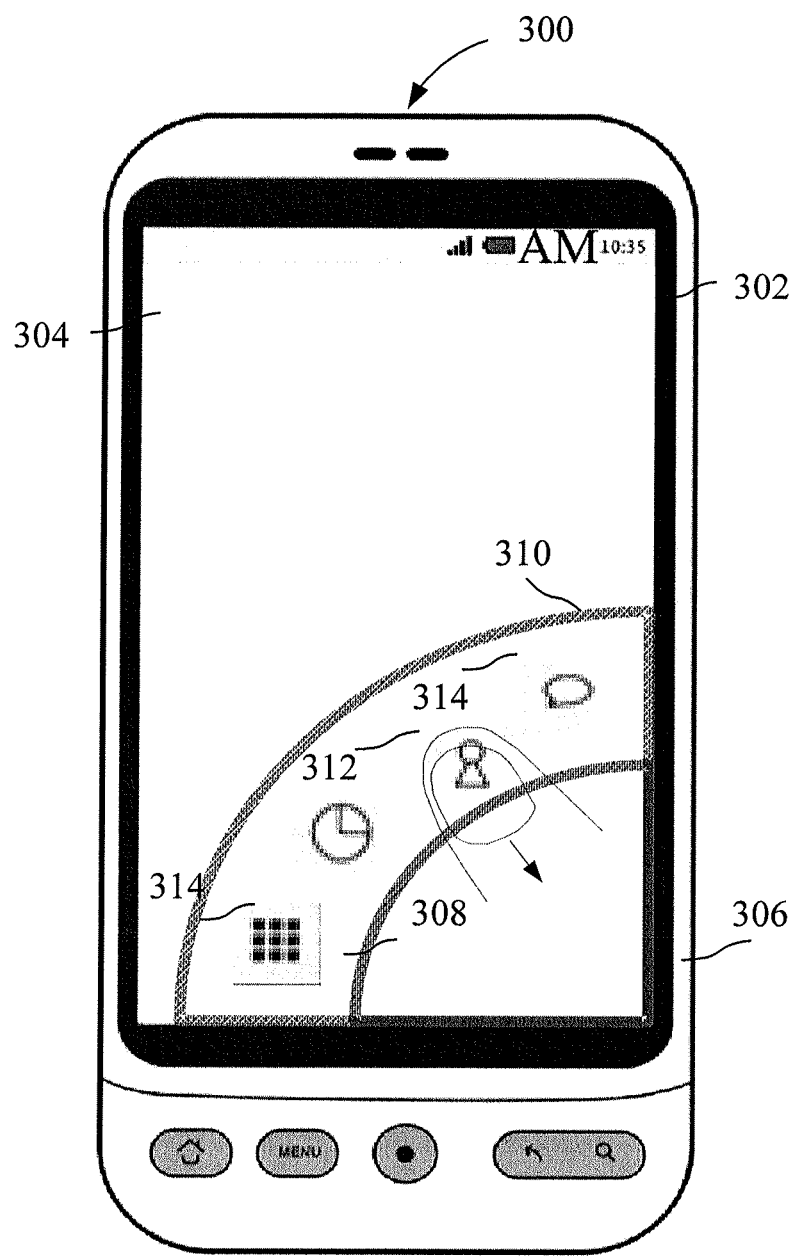
Figure 3B:
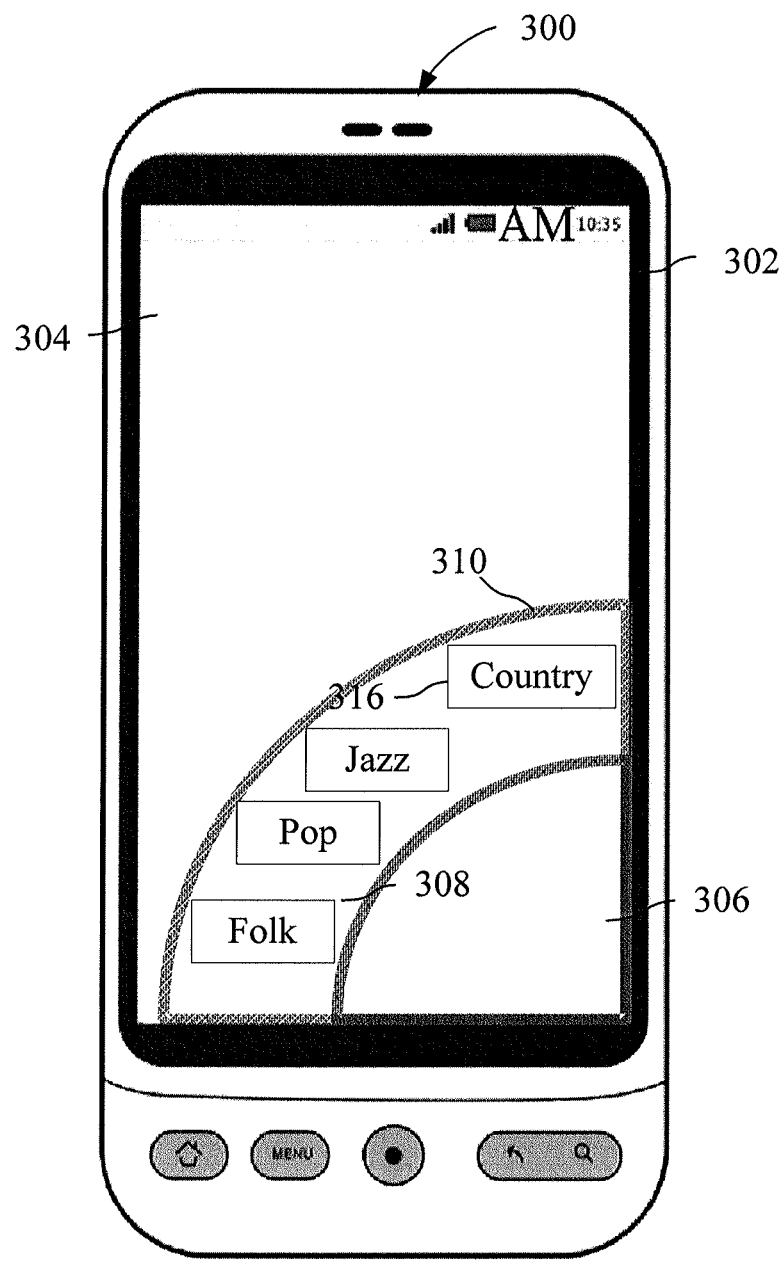

The selectable object 312 is included in the main menu selection area 308. The selectable object 312 is used for presenting various system resources, file resources or executable program ports to a user in a graphical manner. The system resources may be resources, such as memory configuration, power supply, display brightness, volume, wireless communication device state of the interaction device 100, which support an operation of the interaction device 100 to implement various functions. The file resources may refer to various data stored in the memory 250, such as video files, documents, pictures, music, contacts. The executable program may be a music player program 254, a network browser program 256, a graphic processing program 258, a voice communication program 260, a short message communication program 262, a file index/search program 264, a graphical user interface generation program 266 or other applications programs having various functions. After the selectable object 312 is selected, a function corresponding to the selectable object 312 is activated. For example, a configuration interface of various system resources of the interaction device 100 is opened; various data stored in the memory 250 is accessed; or various corresponding programs are executed. In some scenarios, the selectable object 312 may be one object that is located at a central position in one level of architecture, the factor has upper level selectable objects and further has lower level selectable objects, and when the selectable object 312 having such a level of architecture is selected, the corresponding selectable object needs to be searched for in a levelwise expansion manner or levelwise contraction manner. The exemplary implementation provided in the embodiment of the present invention is to select and move in different directions to determine to implement the acquisition of upper level selectable objects or lower level selectable objects of the current selectable object 312. Specifically, referring to FIGS. 3A and 3B, when the selectable object 312 is selected and moves towards a position where any one of the two first boundaries 310 in the main menu selection area 308 is located and the selected selectable object 312 crosses over a predetermined position, the selected selectable object 312 and a selectable object 314 at a same level as the selected selectable object 312 are replaced with lower level selectable objects 318 or upper level selectable objects 316 correlated to the selected selectable object. Taking music selection as an example, when a selectable object 312 representing music file selection and play is selected and moves in a direction of the first boundary 310 of the main menu selection area 308, the selectable objects 316 representing different music styles such as country, jazz, pop, and folk under the selectable object 312 may be used to replace the selectable object 312 and the selectable objects 314 at the same level as the selectable object 312, and correspondingly, the selected selectable object 312 and the selectable objects 314 at the same level as the selectable object 312 will be moved out of the main menu selection area 308. Generally, music files may be categorized into country, jazz, pop, folk, and so on according to different styles, and each style may further be categorized into Chinese, English, Japanese, Korean, and so on according to languages. The different language type may further be categorized into male and female according to the sex gender of a singer. In the gender type, the music files may be further categorized into different albums. The music files categorized in this manner may be managed through the interaction interface provided in the present invention. If the selectable objects 312 representing Chinese, English, Japanese, Korean songs are currently displayed in the main menu selection area 308, the selectable objects representing the song style such as country, jazz, pop, folk are used as upper level selectable objects of the selectable objects 312, and selectable objects representing the gender male or female of the song singer are used as lower level selectable objects 316 of the selectable objects 312. The predetermined position is a critical judgment condition set by a user or by default and used for judging whether to perform switching of selectable objects 312 in the main menu selection area 308. That is, when the selectable object 312 is selected and moves across over the predetermined position, the switching of the selectable object 312 is started according to a movement direction of the selectable object 312, and the predetermined position may be one random critical line set between the two first boundaries 310 or may be either of the two first boundaries 310 itself.

In the interaction interface 300 of the interaction device 100 provided in the embodiment of the present invention, the main menu selection area 308 is set at a corner of the display area 304, the selectable object 312 is presented in the main menu selection area 308 for selection by a user, and the selectable object 312 may move, after being selected, in a direction of the boundary of the main menu selection area 308, that is, the first boundary 310, thereby implementing replacement and selection of the upper level selectable objects or lower level selectable objects of the selected selectable object 312, so that the interaction manner between the whole interaction interface 300 and the user further meets the ergonomic design requirements, and it is convenient for a user to implement a simple, easy, and fast interactive operation through the interaction interface 300.

Figure 4:
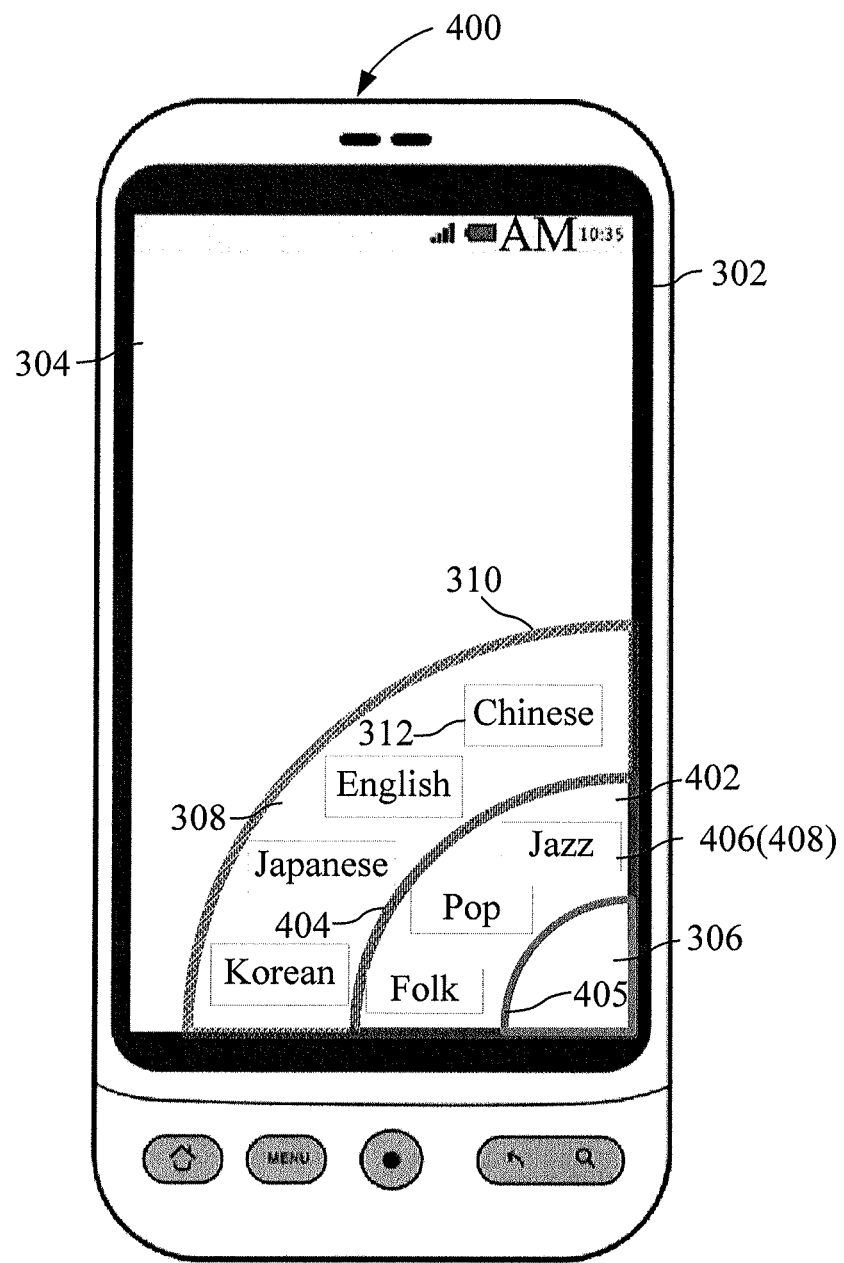
FIGS. 4, 4A, and 4B show an interaction interface and an interaction manner according to an embodiment of the present invention.
Figure 4A:
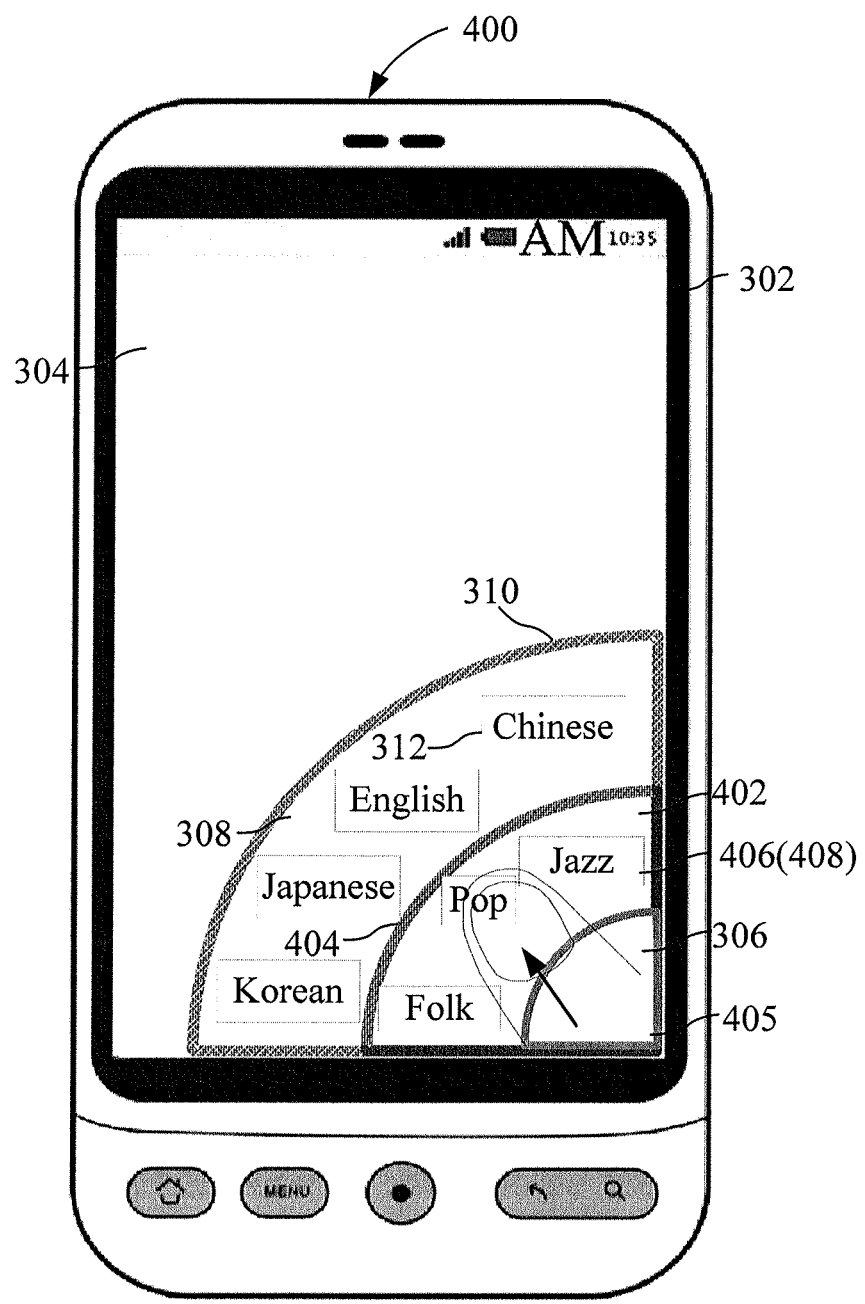
Figure 4B:
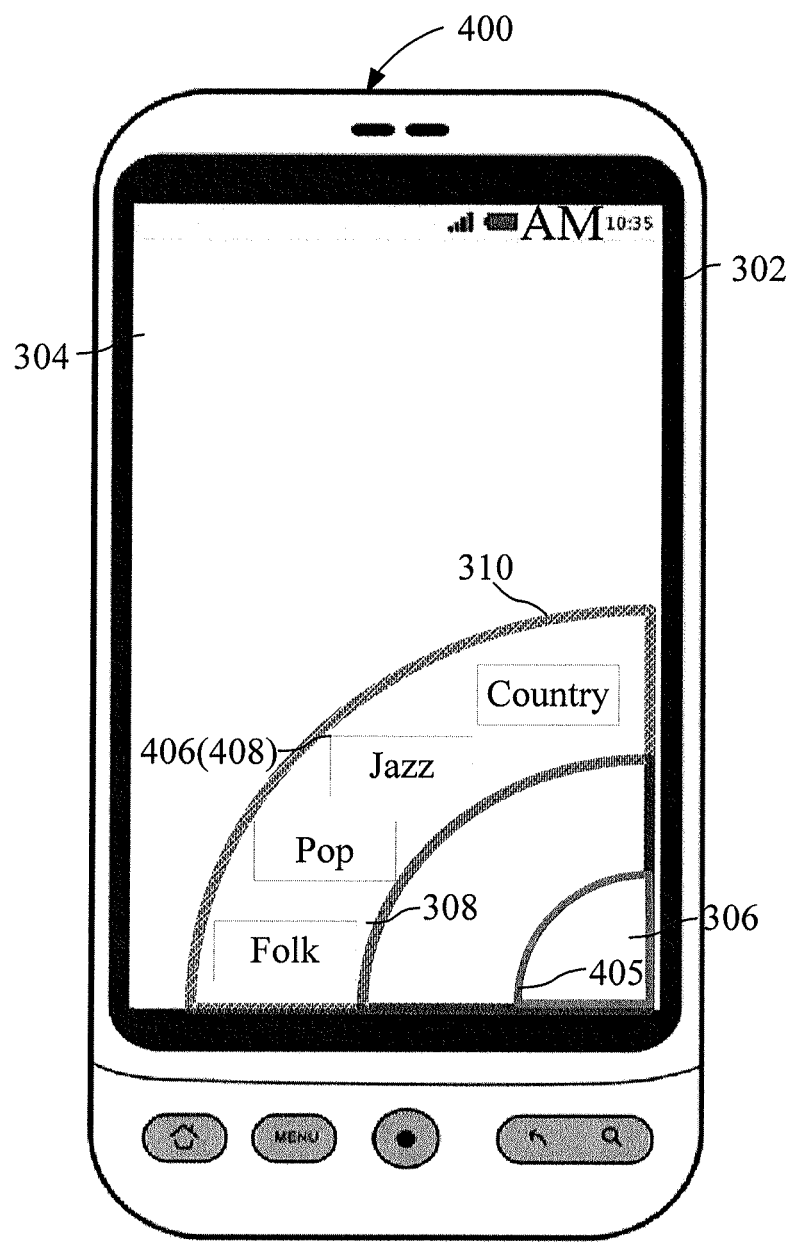

Further, referring to FIGS. 4, 4A, and 4B, FIGS. 4, 4A, and 4B show an interaction interface 400 according to another embodiment of the present invention. In the interaction interface 400, a submenu selection area 402 is added based on the interaction interface 300. That is, the interface interaction unit forms a second boundary 404 and a third boundary 405 in the display area 304 that is outside the main menu selection area 308 and adjacent to the main menu selection area 308, and the second boundary 404 and the third boundary 405 form the submenu selection area 402. The third boundary 405 is farther away from the main menu selection area 308 than the second boundary 404 is. The submenu selection area 402 includes the predetermined upper level selectable objects 316 or lower level selectable objects 318 correlated to the selected selectable object 312. When the selectable object 312 in the main menu selection area 308 is not selected, the submenu selection area 402 includes the upper level selectable objects 406 or lower level selectable objects 408 correlated to the default selectable object 312 in the main menu selection area 308. Correspondingly, the processing unit is further configured to, when the upper level selectable objects 316 and 406 or lower level selectable objects 318 and 408 in the submenu selection area 402 are selected and move towards a position where the second boundary 404 of the submenu selection area 402 is located and the selected upper level selectable objects 316 and 406 or lower level selectable objects 318 and 408 cross over a predetermined position, replace the selectable object 312 in the main menu selection area 308 with the selected upper level selectable objects 316 and 406 or lower level selectable objects 318 and 408.

In this implementation, the submenu selection area 402 is set in a manner of being adjacent to the main menu selection area 308 to represent a correlative relationship between the submenu selection area 402 and the main menu selection area 308. The submenu selection area 402 may abut on the main menu selection area 308, that is, the second boundary 404 of the submenu selection area 402 and the first boundary 310 of the main menu selection area 308 overlap each other, that is, the submenu selection area 402 and the main menu selection area 308 share a boundary. The submenu selection area 402 may be set in an area between the main menu selection area 308 and the corner area 306 according to demands, and may also be generated at a side of the main menu selection area 308 far away from the corner area 306. The submenu selection area 402 is configured to display the upper level selectable objects 406 or lower level selectable objects 408 correlated to the selectable object 312 in the main menu selection area 308. By taking music file management as an example, if a selectable object representing a language type of a song such as Chinese, English, Japanese, and Korean is presented in the main menu selection area 308, selectable objects representing styles such as Chinese, English, Japanese, and Korean of music files of various languages in the main menu selection area 308 may be presented in the submenu selection area 402, or selectable objects representing the gender of a singer in a certain language among various languages in the main menu selection area 308 may be presented in the submenu selection area 402. By presenting the upper level selectable objects 406 or lower level selectable objects 408 correlated to the selectable object 312 in the main menu selection area 308 in the submenu selection area 402, a user may be enabled to learn partial architecture of the currently managed object such as a music file, and through the understanding of the partial architecture, the user may be enabled to properly make a corresponding operative action according to such architecture, that is, in which direction to move the selectable object 312 or move the upper level selectable object 406 or lower level selectable object 408 to acquire the desired target object. In the implementation of the present invention, the upper level selectable object 406 or lower level selectable object 408 correlated to the selectable object 312 in the main menu selection area 308 is to be selected and move towards a position of the second boundary 404 of the submenu selection area 402 to replace selectable object 312 in the main menu selection area 308, that is to say, when the upper level selectable object 406 or lower level selectable objects 408 presented in the submenu selection area 402 moves in the direction of the main menu selection area 308, a content synchronous response can be displayed in the main menu selection area 308, that is, in this implementation, the upper level selectable objects 406 or lower level selectable objects 408 replace the selectable object 312 in the main menu selection area 308, and on the basis of maintaining accurate presentation of the level architecture of the file or system of the selectable object 312, the user may conveniently and rapidly browse and acquire the desired target object.

Figure 5:
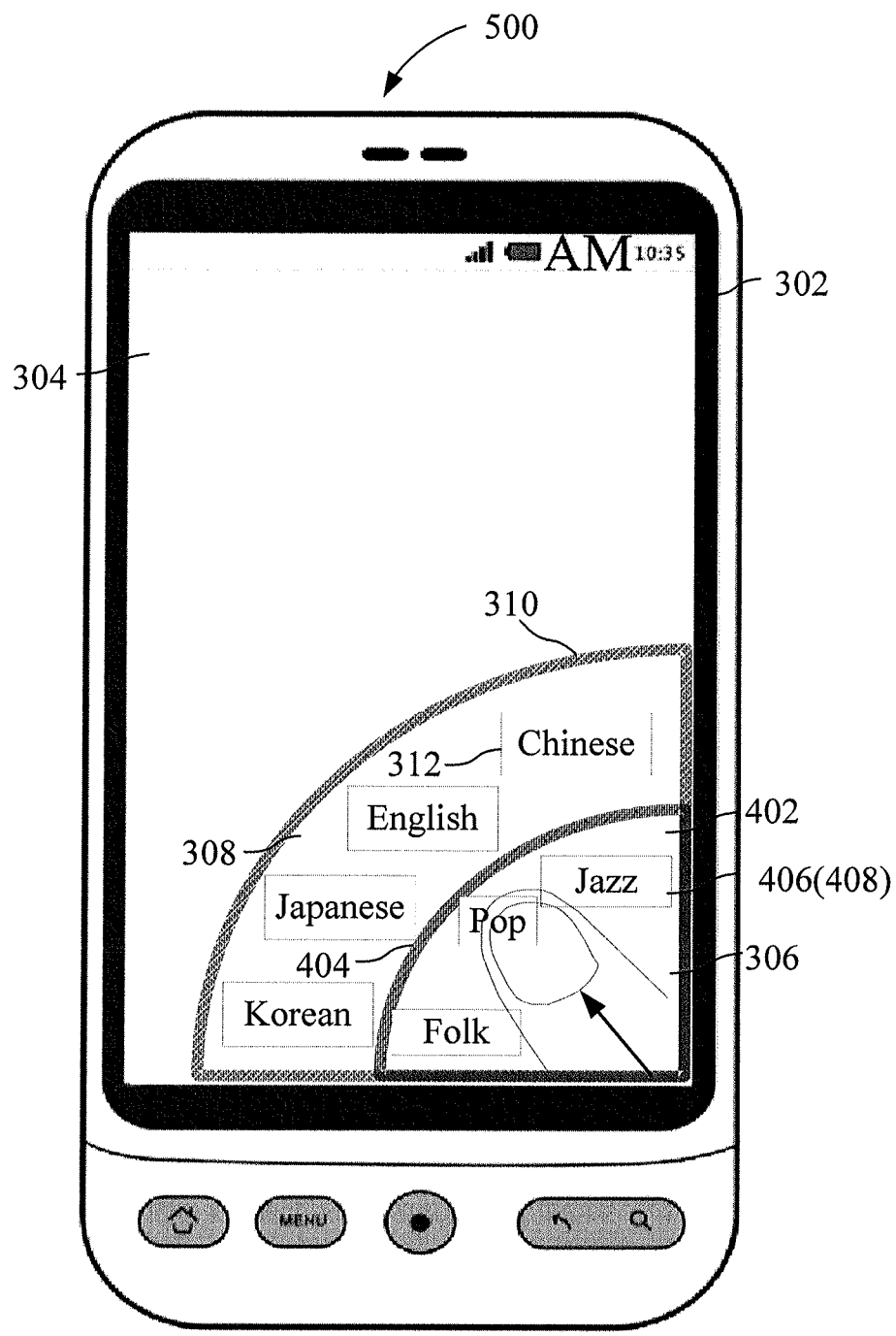
FIGS. 5 and 5A show an interaction interface and an interaction manner according to an embodiment of the present invention.
Figure 5A:
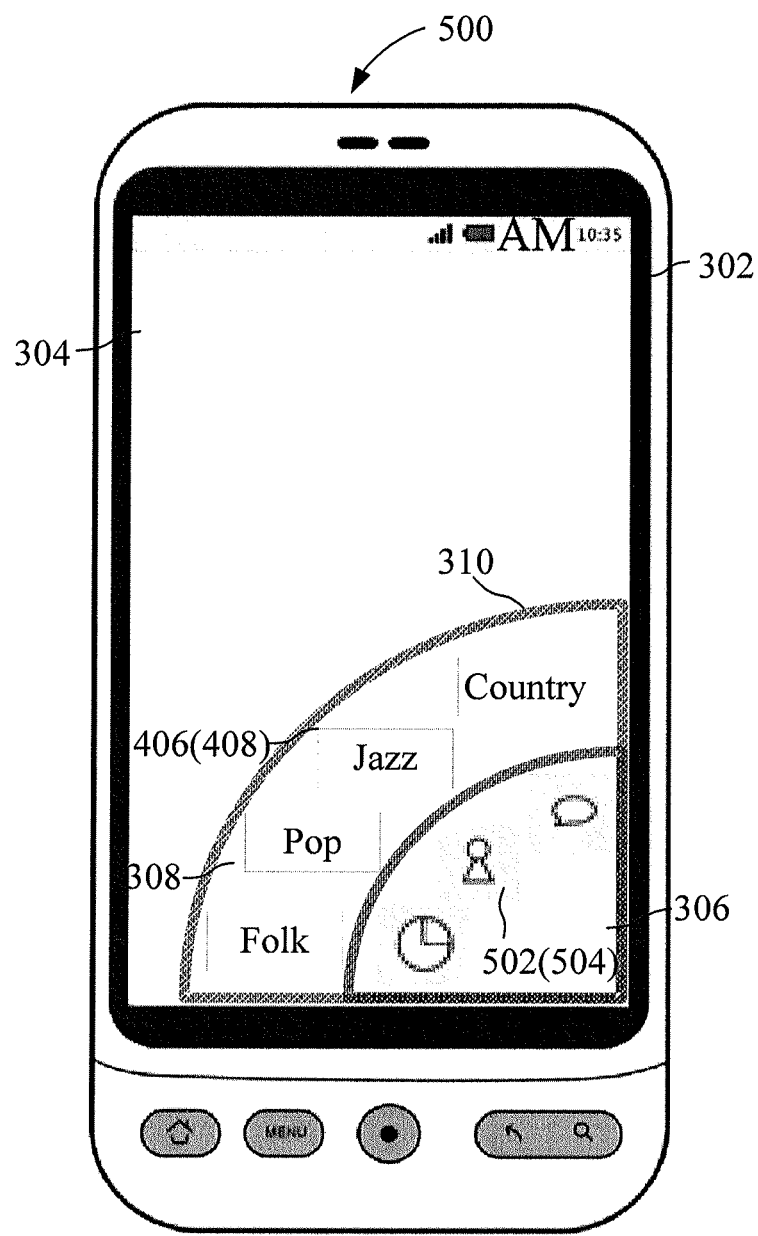

Further, referring to FIGS. 5 and 5A, on the basis of the implementation provided in FIG. 4, the implementation of the present invention further includes the following step. When the processing unit selects the upper level selectable objects 316 and 406 or lower level selectable objects 318 and 408 correlated to the selectable object 312 in the main menu selection area 308 and moves the same towards the position where the second boundary 404 of the submenu selection area 402 is located to replace the selected selectable object 312 in the main menu selection area 308, the interface interaction unit is further configured to display further upper level selectable objects 502 correlated to the selected upper level selectable objects 316 and 406 or further lower level selectable objects 504 correlated to the selected lower level selectable objects 318 and 408 in the submenu selection area 402. In the implementation provided in the present invention, when the upper level selectable object 406 or lower level selectable object 408 correlated to the selectable object 312 in the main menu selection area 308 in the submenu selection area 402 is selected and moves in a direction of the main menu selection area 308, it is ensured that the submenu selection area 402 can correspondingly update the content presented in the submenu selection area 402 according to the level architecture of the file or system of the selectable object, so that the user can browse and select the target object more conveniently.

Figure 6:
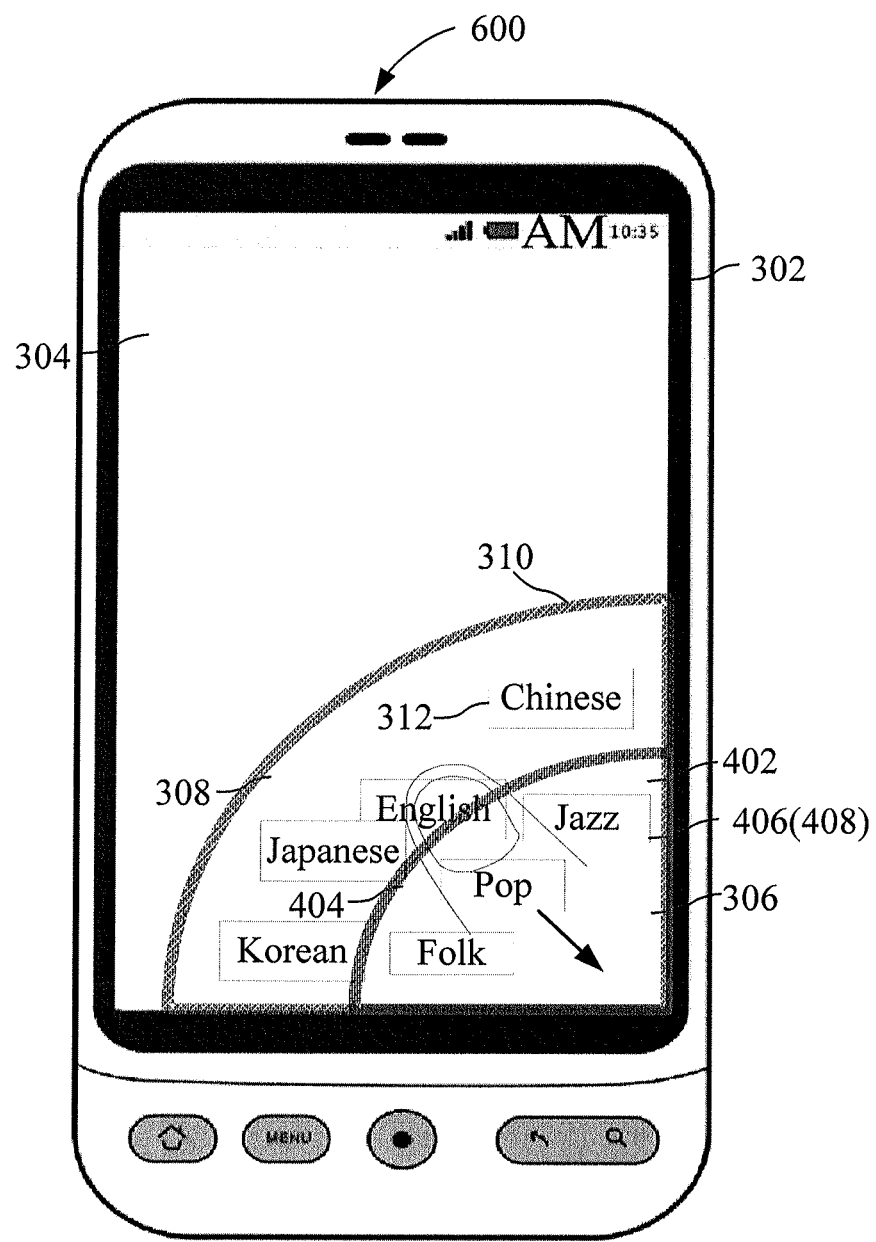
FIGS. 6 and 6A show an interaction interface and an interaction manner according to an embodiment of the present invention.
Figure 6A:
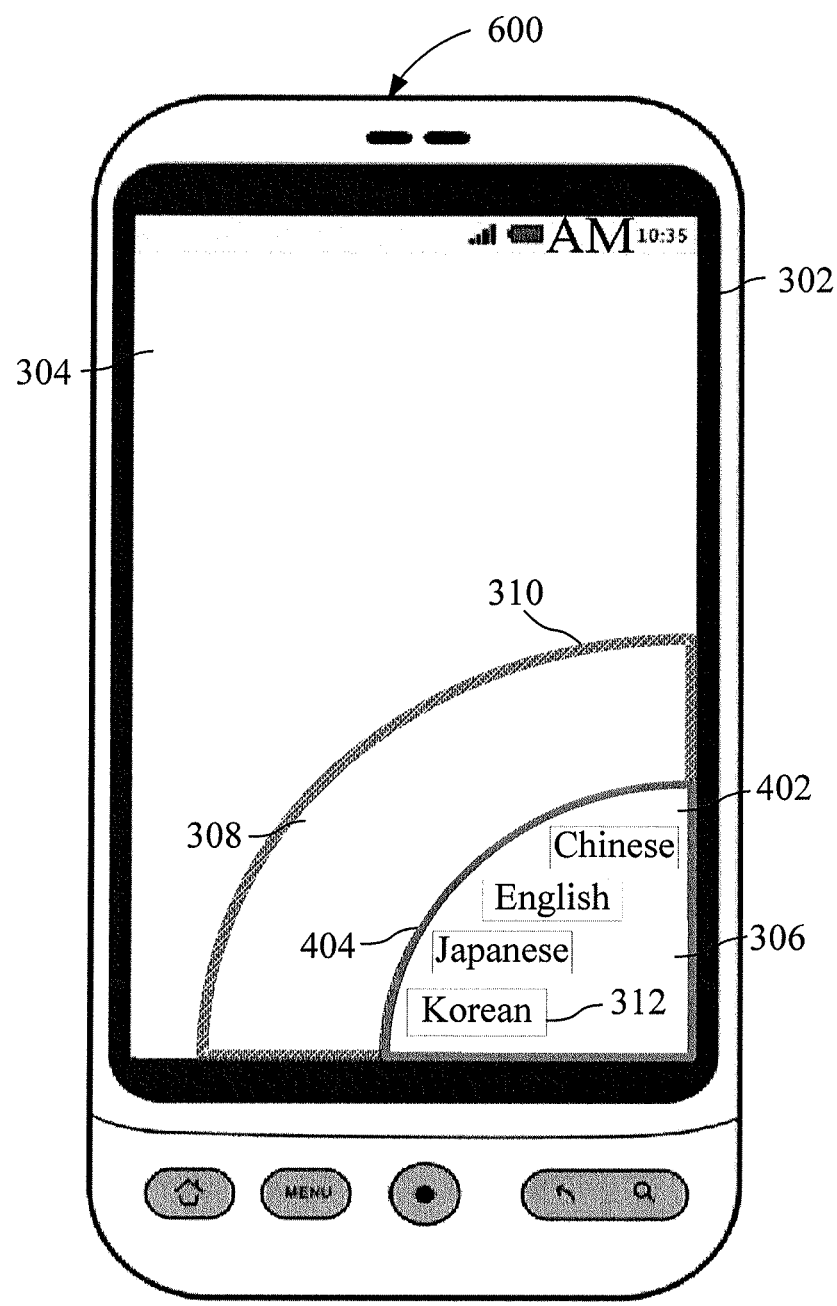

Further, referring to FIGS. 6 and 6A, on the basis of the implementation provided in FIG. 4, the implementation of the present invention further includes the following step. When the selectable object 312 in the main menu selection area 308 is selected and moves towards the first boundary 310 that is adjacent to the second boundary 404 of the submenu selection area 402 and the selected selectable object 312 crosses over a predetermined position, the processing unit replaces the upper level selectable objects 316 and 406 or lower level selectable objects 318 and 408 correlated to the selected selectable object 312 in the submenu selection area 402 with the selectable object 312 in the main menu selection area 308. In the implementation provided in the present invention, when the selectable object 312 in the main menu selection area 308 is selected and moves in a direction of the submenu selection area 402, it is ensured that the main menu selection area 308 can correspondingly update the content presented in the main menu selection area 308 according to the level architecture of the file or system of the selectable object, so that the user can browse and select the target object more conveniently.

Figure 7:
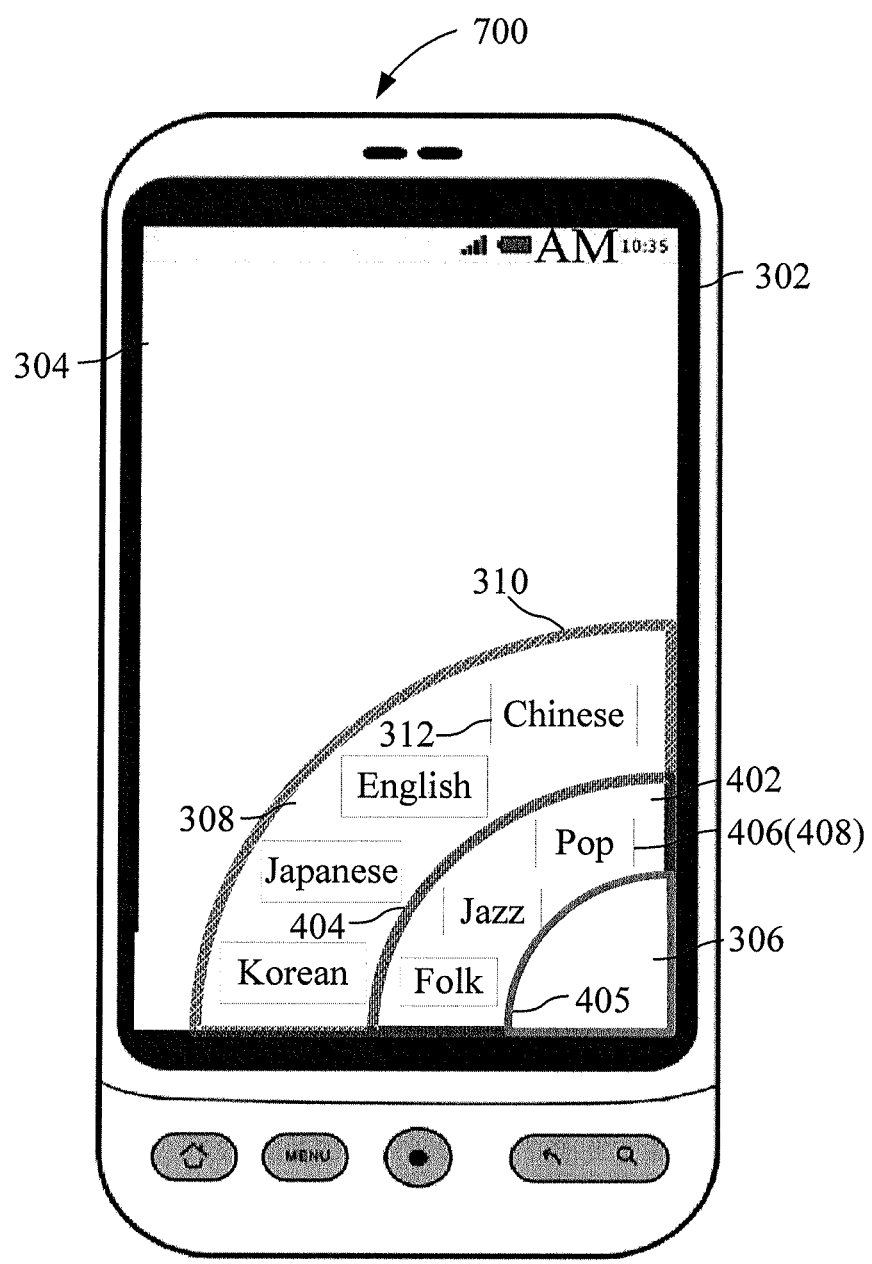
FIGS. 7 and 7A show an interaction interface and an interaction manner according to an embodiment of the present invention.
Figure 7A:
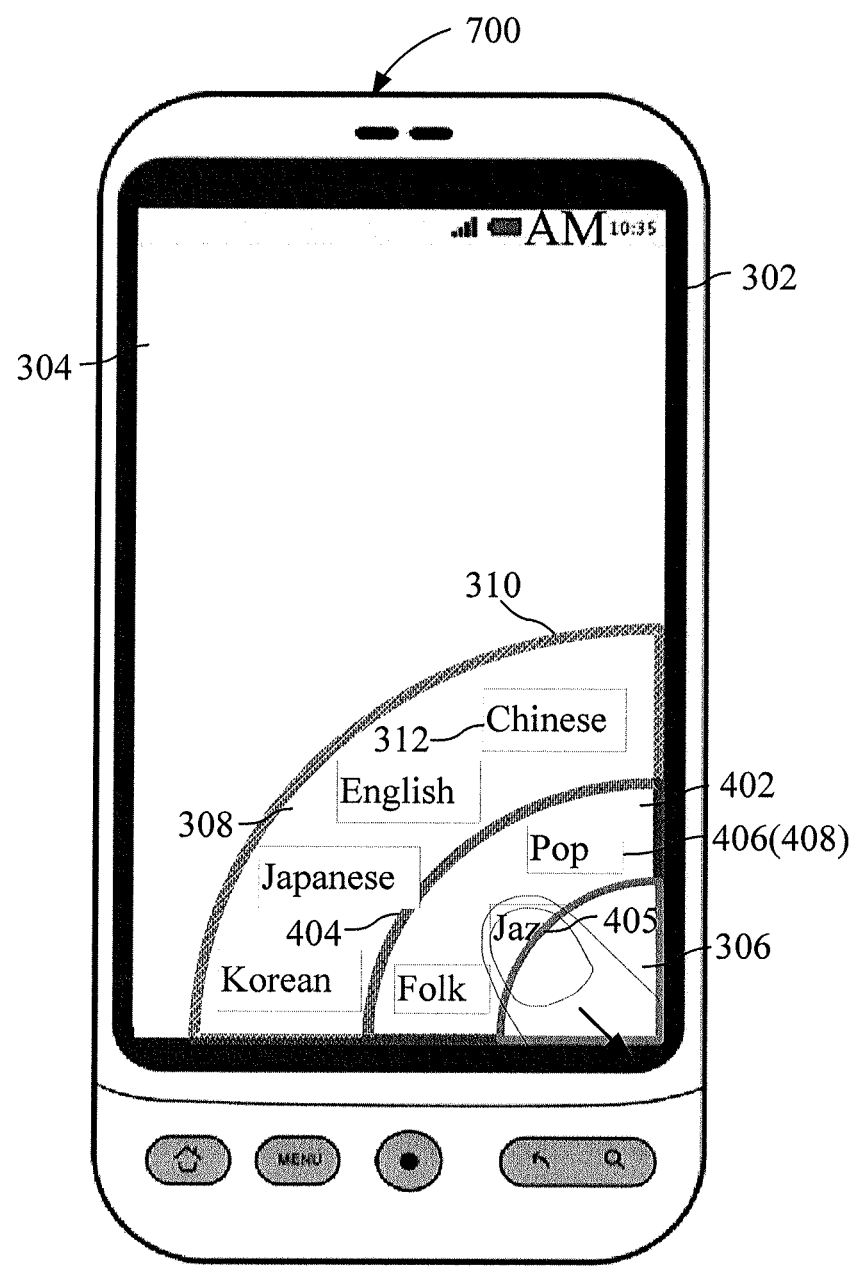

Further, on the basis of the implementation provided in FIG. 4, referring to FIGS. 7 and 7A, the third boundary 405 and the second boundary 404 do not intersect each other in the display area 304, and the upper level selectable objects 406 or lower level selectable objects 408 correlated to the selectable object 312 in the main menu selection area 308 are located between the second boundary 404 and third boundary 405. The processing unit is further configured to, when the upper level selectable objects 316 and 406 or lower level selectable objects 318 and 408 correlated to the selectable object 312 in the main menu selection area 308 are selected and move towards a position where the third boundary 405 of the submenu selection area 402 is located and the upper level selectable objects 316 and 406 or lower level selectable objects 318 and 408 cross over a predetermined position, replace the upper level selectable objects 316 and 406 or lower level selectable objects 318 and 408 of the submenu selection area 402 with the selectable object 312 in the main menu selection area 308. In the implementation provided in the present invention, when the upper level selectable object 406 or lower level selectable object 408 in the submenu selection area 402 is selected and moves in a direction away from the main menu selection area 308, that is, towards the position where the third boundary 405 is located, it is ensured that the selectable object 312 in the main menu selection area 308 can replace the content presented in the submenu selection area 402, so that the content presented in the submenu selection area 402 may be correspondingly updated according to the level architecture of the file or system of the selectable object, and the user can browse and select the target object more conveniently. It may be understood that, in this implementation, when the upper level selectable object 406 or lower level selectable object 408 correlated to the selectable object 312 in the main menu selection area 308 is selected and moves towards a position where the third boundary 405 of the submenu selection area 402 is located and the upper level selectable objects 406 or lower level selectable objects 408 are replaced with the selectable object 312 in the main menu selection area 308, if the selected upper level selectable object 406 does not have a correlated further upper level selectable object or the selected lower level selectable object 408 does not have a correlated further lower level selectable object, the main menu selection area 308 is used to present a blank to inform the user that the top level or bottom level of the file or system of the viewed object has been reached.

Figure 8:
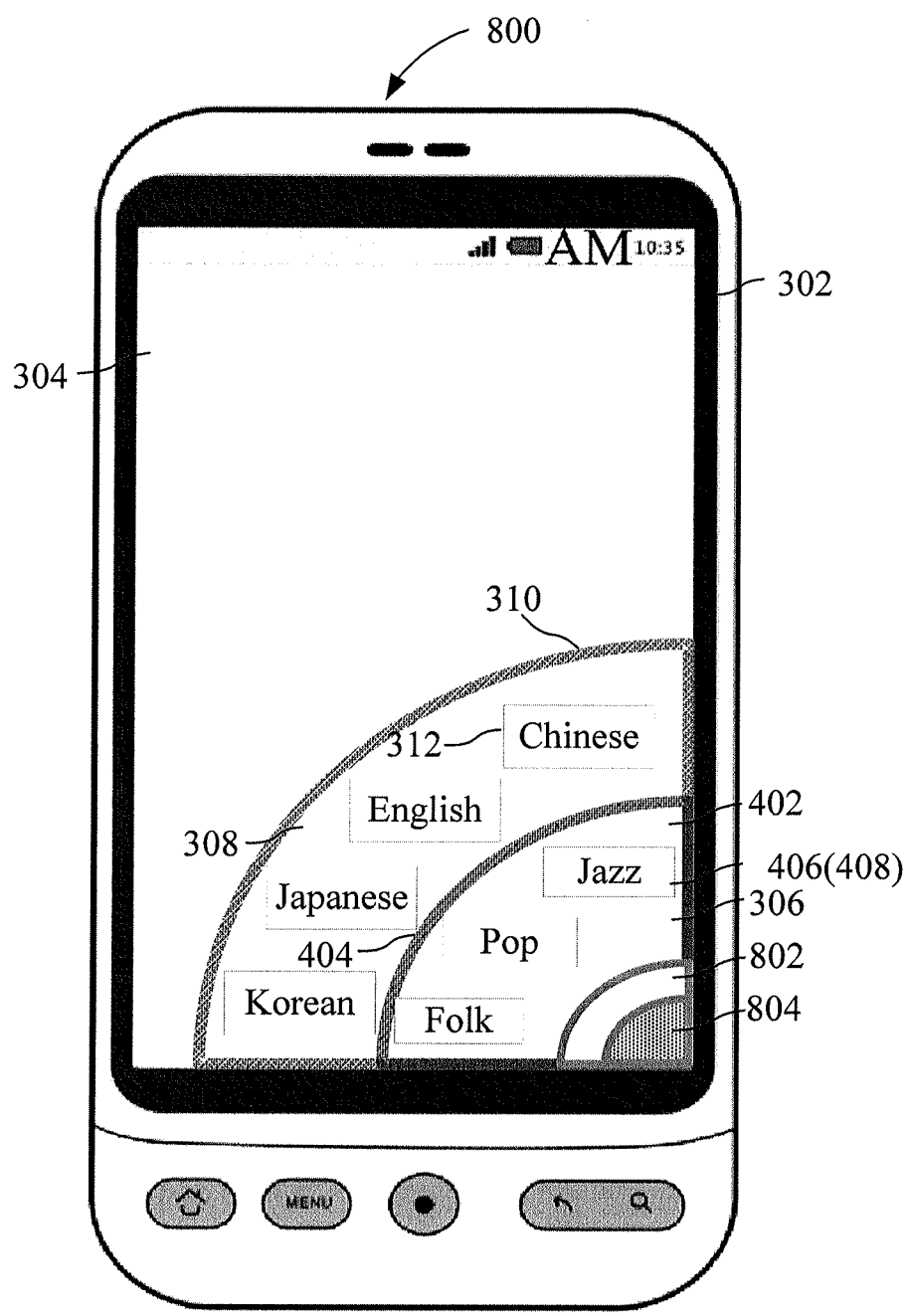
FIG. 8 shows an interaction interface according to an embodiment of the present invention.

Further, on the basis of the implementation provided in FIG. 4, referring to FIG. 8, another implementation provided in the present invention further includes the following step. The interface interaction unit generates a sub display area 802 between the corner area 306 and the main menu selection area 308, where the sub display area 802 includes a menu activation control 804, and correspondingly, the processing unit is configured to, when the menu activation control 804 is selected, activate the main menu selection area 308 in the display area 304. In the implementation, by generating the menu activation control 804 in the corner area 306, the main menu selection area 308 is activated or presented when necessary, and when unnecessary, the main menu 308 is concealed and the display space of the display area 304 is released.

Further, the interaction interface 300 of the interaction apparatus 100 provided in the embodiment of the present invention may interact with a user through a touch sensing technology, that is, the interface interaction unit includes a touch sensing interface, and the interaction interface generated through the interface interaction unit uses a touch sensing interface to respond to a touch action that occurs on the interaction interface. The touch action includes a tap for selecting a selectable object in the display area and a slide for moving the selected selectable object. The implementation of the interactive operation between the interaction interface and the user by using the touch sense technology may make the interaction between the user and the device more convenient and smoother.

Further, in the implementation provided in the embodiment of the present invention, the processing unit is further configured to, when the selectable object 312 in the main menu selection area 308 is selected and moves in an extending direction of the first boundary 310 of the main menu selection area 308, display the predetermined selectable objects 312 at a same level as the selected selectable object 312 in the main menu selection area 308 in an alternating manner. In the implementation, the selectable object 312 in the main menu selection area 308 may move in an extending direction of the first boundary 310 of the main menu selection area 308, thereby presenting multiple selectable objects 312 in the main menu selection area 308. When a large number of selectable objects 312 exist in the main menu selection area 308 and cannot be displayed in the main menu selection area 308 at the same time, the selectable objects 312 currently displayed in the main menu selection area 308 may be slid to display the selectable objects that are not displayed yet, so that the user can search for the target object conveniently.

Further, it may be understood that, the boundary between the main menu selection area and the submenu selection area provided in the embodiment of the present invention may be in various shapes, and exemplarily, the first boundary of the main menu selection area and the second boundary and third boundary of the submenu selection area are in an arc shape.

Figure 9:
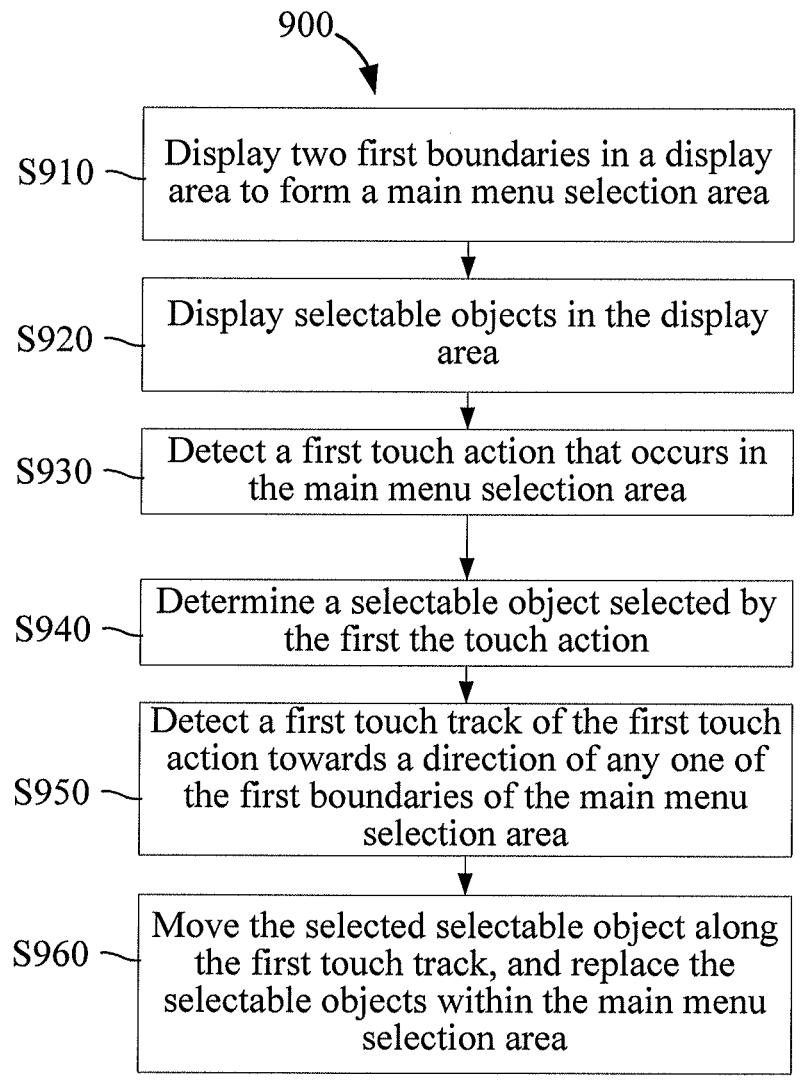
FIGS. 9 to 16 show an interaction method according to an embodiment of the present invention.

Referring to FIG. 9, an interaction method 900 is provided in an embodiment of the present invention. The interaction method 900 is used for providing a user with an operable user interface and implementing an interactive operation with the user through the user interface. The interaction method 900 includes the following:

S910: Display two first boundaries in a display area, where the display area includes multiple display boundaries, a corner area is formed between every two adjacent display boundaries, the two first boundaries are located at a position that is corresponding to the at least one corner area in the display area, the two first boundaries do not intersect each other in the display area and cross the corner area, respectively, to intersect display boundaries that are at two sides of the corner area, and the two first boundaries and the display boundaries that are at the two sides of the corner area form a main menu selection area.

In this step, the interaction device may invoke a graphical user interface generation program 266 to generate an interaction interface according to a predetermined interface model; the generated interaction interface is the same as the interaction interface 300 presented in FIG. 3 in the embodiment of the present invention; and the interaction interface 300 includes a display area 304 formed of multiple display boundaries 302. Among the multiple display boundaries 302, a corner area 306 is generated between adjacent display boundaries 302. A main menu selection area 308 is generated in at least one corner area 306 of the display area 304. The main menu selection area 308 includes two first boundaries 310, and the two first boundaries 310 of the main menu selection area 308 do not intersect each other in the display area 304 and cross the corner area 306, respectively, to intersect the display boundary 302 that are at the two sides of the corner area 306. The position of the main menu selection area 308 meets the ergonomic design, which can reduce the physical fatigues of the user in an operational process, that is, the position of the main menu selection area 308 can be acquired and operated by the user more easily, so as to avoid physical fatigues and damages of the user due to a long term operation.

S920: Display selectable objects in the display area, where the selectable objects are located in the main menu selection area in the display area.

A predetermined selectable object display range is determined through the main menu selection area generated in the foregoing step, and the selectable objects are presented in the display range determined through the main menu selection area. The step of displaying the selectable objects and the action of displaying the main menu selection area may be performed at the same time, and also, may follow a time sequence that the main menu selection area is generated and then the selectable objects are generated.

S930: Detect a first touch action that occurs in the main menu selection area to acquire a position where the first touch action occurs.

Through the foregoing step, the interaction interface may be generated, and the user may implement the interaction with the interaction device that has the interaction interface through the generated interaction interface. In this implementation, the interaction between the user and the interaction device is performed in a touch manner, that is, the generated interaction interface is presented on a touch display screen, and the user may perform interaction with the interaction device through the touch action on the touch display screen. During the interaction, the touch display screen detects a first touch action that occurs in the main menu selection area to acquire a position where the first touch action occurs, so as to determine a target object corresponding to the first touch action through the position where the first touch action occurs.

S940: Determine, according to the acquired position where the first touch action occurs, a selectable object selected by the first touch action.

After acquiring the specific position where the first touch action occurs, the touch display screen feeds back the specific position to a processor of the interaction device, and the processor of the interaction device determines, according to the position where the touch action occurs and the model data of the interaction interface, a target object, that is, a selectable object corresponding to a corresponding specific position where the first touch action occurs. After the selectable object is determined, the processor may enable the display screen to prompt a selected selectable object in a visual, acoustic or tact prompt manner, for example, by enlarging the selected selectable object, or making a sound that represents the selection, or in a manner of vibration of the interaction device to indicate that the target object is selected.

S950: Detect a first touch track of the first touch action towards a direction of any one of the first boundaries of the main menu selection area.

S960: Move, along the first touch track, the selectable object selected by the first touch action, and when the selectable object selected by the first touch action crosses over a predetermined position, replace the selectable object selected by the first touch action and predetermined selectable objects at a same level as the selected selectable object with predetermined upper level selectable objects or lower level selectable objects correlated to the selected selectable object.

After selecting a selectable object through the first touch action, the user may acquire upper level selectable objects or lower level selectable objects correlated to the selectable object according to the demands. For convenience of the operations of the user and to meet the ergonomic design, in the implementation of the present invention, the slide action in the direction of one random first boundary of the menu selection area is used as a trigger instruction for triggering or acquiring upper level selectable objects or lower level selectable objects correlated to the selected selectable object. That is, after the first touch action selects a certain selectable object, the touch display screen continues determining a touch track of the first touch action, and feeds back the acquired touch track to the processor, and the processor moves the selected selectable object according to the touch track of the first touch action. When the touch track of the first touch action is towards the direction of the first boundary of the main menu selection area and a span of the movement track in the display area meets a predetermined rule or threshold value, that is, when the selectable object selected by the first touch action crosses over a predetermined position along the movement track, the processor sends an instruction of changing selectable objects, that is, replacing the selectable object selected by the first touch action and selectable objects at a same level as the selected selectable object with upper level selectable objects or lower level selectable objects correlated to the selected selectable object.

In the interaction method provided in the embodiment of the present invention, by providing a user with an interaction interface that meets the ergonomics and is easy to operate, the user is enabled to browse and select a target object conveniently and rapidly through a touch operation, so as to simplify the interaction process, enhance the interaction efficiency, and reduce the physical fatigue of the user in the interaction process.

Figure 10:
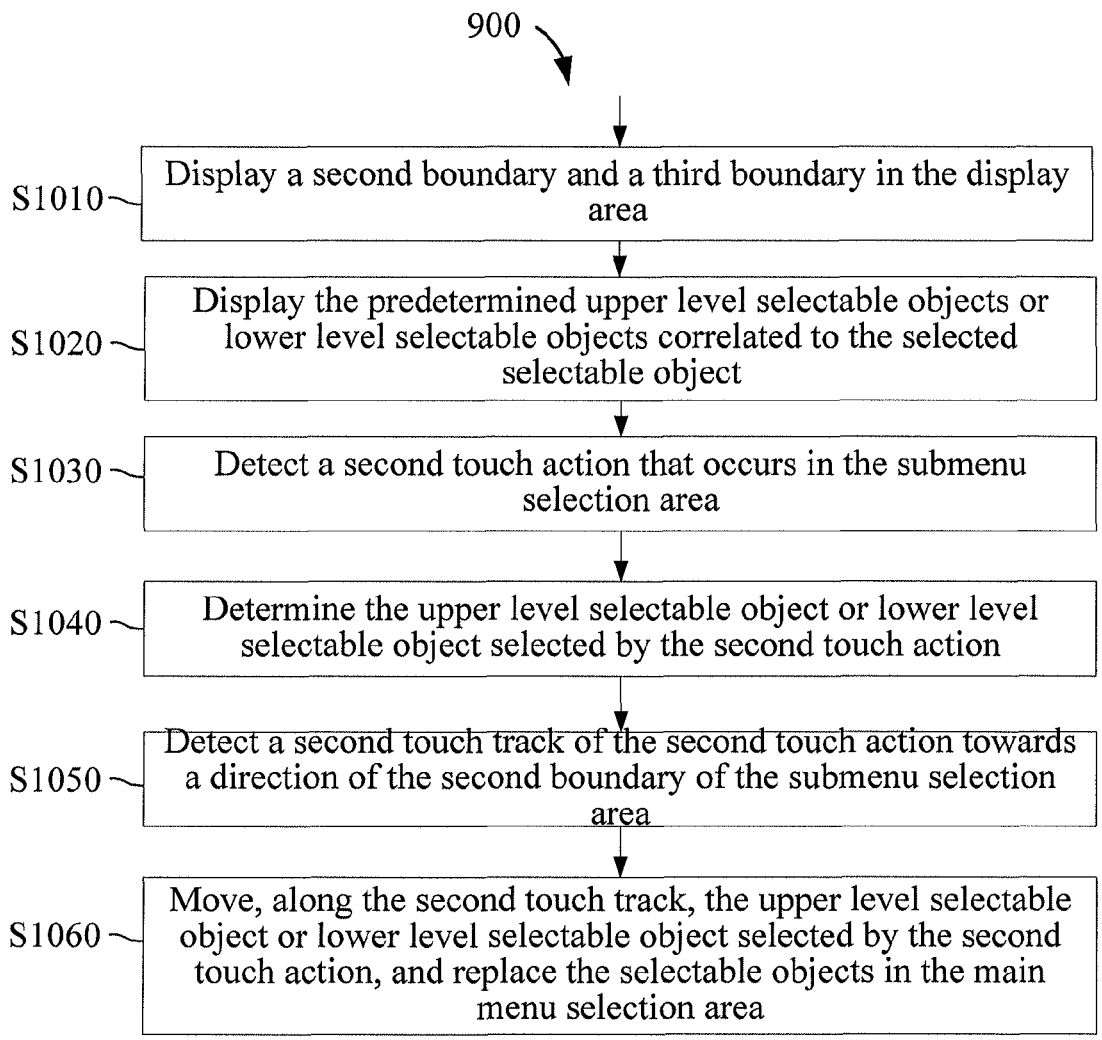

Referring to FIG. 10, an interaction method 900 provided in an embodiment of the present invention further includes the following:

S1010: Display a second boundary and a third boundary in the display area, where the second boundary and the third boundary are located outside the main menu selection area and the third boundary is farther away from the main menu selection area than the second boundary is; and the second boundary and the third boundary form a submenu selection area.

To make it convenient for a user to learn or view the practical architecture of a system or file of a further target object more explicitly and make the interaction between the user and the interaction device smoother, on the basis of the main menu selection area provided in the interaction method 900 that is provided in embodiment of the present invention, a graphical user interface generation program 266 is invoked to generate, according to a predetermined interface model, an interaction interface that includes the main menu selection area 308 and a submenu selection area 402, and the interaction interface is the same as the interaction interface 400 presented in FIG. 4 in the embodiment of the present invention. That is, a submenu selection area 402 is generated near the main menu selection area 308; the submenu selection area 402 includes a second boundary 404 and a third boundary 405 that are adjacent to the first boundary 310 of the main menu selection area 308; and the third boundary 405 is farther away from the main menu selection area 308 than the second boundary 404 is. The step may be performed synchronously with step S910, and may also be performed after step S910 according to different demands. After S1010 is performed, the processor further defines a menu selection area in the display area for further displaying the target object in the submenu selection area 402, so as to present more information of the target object to the user, and at the same time, present to a user the specific level architecture of the system or file of the target object more explicitly, so that the user can search for a desired target object conveniently and rapidly.

S1020: Display the predetermined upper level selectable objects or lower level selectable objects correlated to the selected selectable object, where the predetermined upper level selectable objects or predetermined lower level selectable objects correlated to the selected selectable object are located in the submenu selection area.

In the step, the upper level selectable objects or lower level selectable objects correlated to the selectable object are displayed in the submenu selection area, which may provide the user with more information about the selectable objects.

S1030: Detect a second touch action that occurs in the submenu selection area to acquire a position where the second touch action occurs.

Through the above step, an interaction interface may be generated, and the user may implement the interaction with the interaction device that has the interaction interface through the generated interaction interface. In this implementation, the user performs the interaction with the interaction device in a touch manner, that is, the generated interaction interface is presented on a touch display screen, and the user may perform the interaction with the interaction device through a touch action on the touch display screen. During the interaction, the touch display screen detects a second touch action that occurs in the main menu selection area to acquire a position where the second touch action occurs, so as to determine a target object corresponding to the second touch action through the position where the second touch action occurs.

S1040: Determine, according to the acquired position where the second touch action occurs, the upper level selectable object or lower level selectable object selected by the second touch action.

After acquiring the specific position where the second touch action occurs, the touch display screen feeds back the specific position to the processor of the interaction device, and the processor of the interaction device determines, according to the position where the touch action occurs and the model data of the interaction interface, a target object corresponding to the corresponding specific position where the second touch action occurs. After the selectable object serving as the target object is determined, the processor may enable the display screen to prompt the selected selectable object in a visual, acoustic or tact prompt manner, for example, by enlarging the selected selectable object, or making a sound that represents the selection, or a manner of vibration of the interaction device to indicate that the target object is selected.

S1050: Detect a second touch track of the second touch action towards a direction of the second boundary of the submenu selection area.

S1060: Move, along the second touch track, the upper level selectable object or lower level selectable object selected by the second touch action, and when the upper level selectable object or lower level selectable object selected by the second touch action crosses over a predetermined position, replace the selectable objects in the main menu selection area with the upper level selectable object or lower level selectable object selected by the second touch action and selectable objects at a same level as the selected upper level selectable object or selected lower level selectable object.

After selecting the upper level selectable object or lower level selectable object correlated to the selectable object through the second touch action, the user may acquire, according to the demands, further upper level selectable objects or further lower level selectable objects correlated to the upper level selectable object or lower selectable object correlated to the selectable object. For convenience of the operations of a user and to meet the ergonomic design, in the implementation of the present invention, a slide action in the direction of one random second boundary of the submenu selection area is used as a trigger instruction for triggering or acquiring the further upper level selectable objects or further lower level selectable objects correlated to the upper level selectable object or lower level selectable object correlated to the selectable object, that is, after the second touch action selects the further upper level selectable object or the further lower level selectable object correlated to the upper level selectable object or lower level selectable object correlated to the selectable object, the touch display screen continues determining a touch track of the second touch action, and feeds back the acquired touch track to the processor, and the processor moves, according to the touch track of the second touch action, the selected further upper level selectable object or further lower level selectable object. When the touch track of the second touch action is towards the direction of the second boundary of the submenu selection area, and a span of the movement track in the display area meets a predetermined rule or threshold value, the processor sends an instruction of changing selectable objects, that is, replacing the selectable objects in the main menu selection area with the upper level selectable object or lower level selectable object selected by the second touch action and selectable objects at a same level as the selected upper level selectable object or selected lower level selectable object.

In the interaction method provided in the embodiment of the present invention, by providing a user with an interaction interface that meets the ergonomics and is easy to operate, the user is enabled to browse and select a target object conveniently and rapidly through a touch operation, so as to simplify the interaction process, enhance the interaction efficiency, and reduce the physical fatigue of the user in the interaction process.

Figure 11:
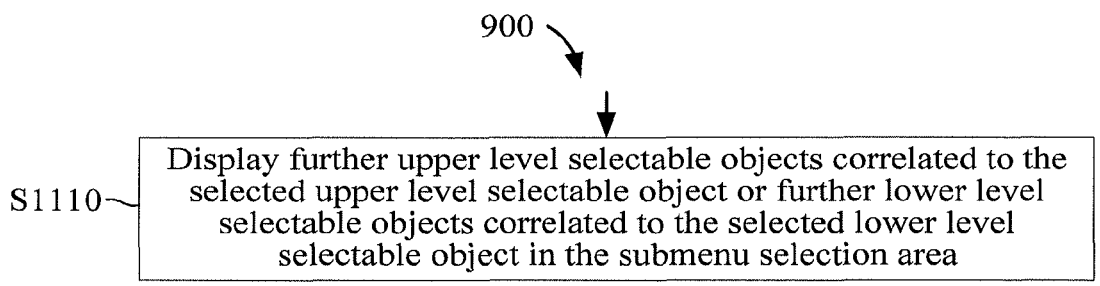

Referring to FIG. 11, in the interaction method 900 provided in the embodiment of the present invention, when the selectable objects in the main menu selection area are replaced with the upper level selectable object or lower level selectable object selected by the second touch action and selectable objects at a same level as the selected upper level selectable object or selected lower level selectable object, the method further includes the following:

S1110: Display further upper level selectable objects correlated to the selected upper level selectable object or further lower level selectable objects correlated to the selected lower level selectable object in the submenu selection area.

Figure 12:
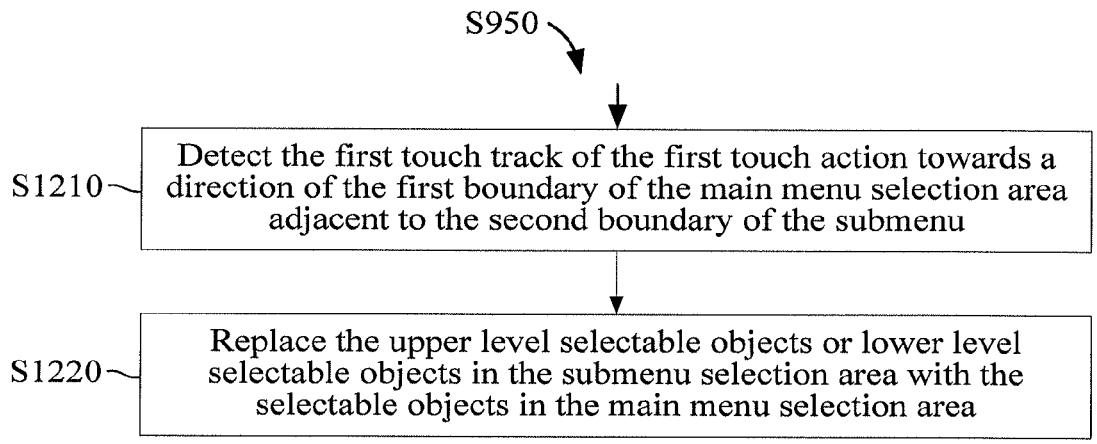

Referring to FIG. 12, in the interaction method 900 provided in the embodiment of the present invention, the step S950, that is, the detecting a first touch track of the first touch action towards a direction of any one of the first boundaries of the main menu selection area specifically includes the following:

S1210: Detect the first touch track of the first touch action towards a direction of the first boundary of the main menu selection area adjacent to the second boundary of the submenu.

Correspondingly, during the step S960, that is, the moving, along the first touch track, the selectable object selected by the first touch action, and replacing the selectable object selected by the first touch action and selectable objects at a same level as the selected selectable object with upper level selectable objects or lower level selectable objects correlated to the selected selectable object, the method further includes the following:

S1220: Replace the upper level selectable objects or lower level selectable objects in the submenu selection area with the selectable objects in the main menu selection area.

Figure 13:
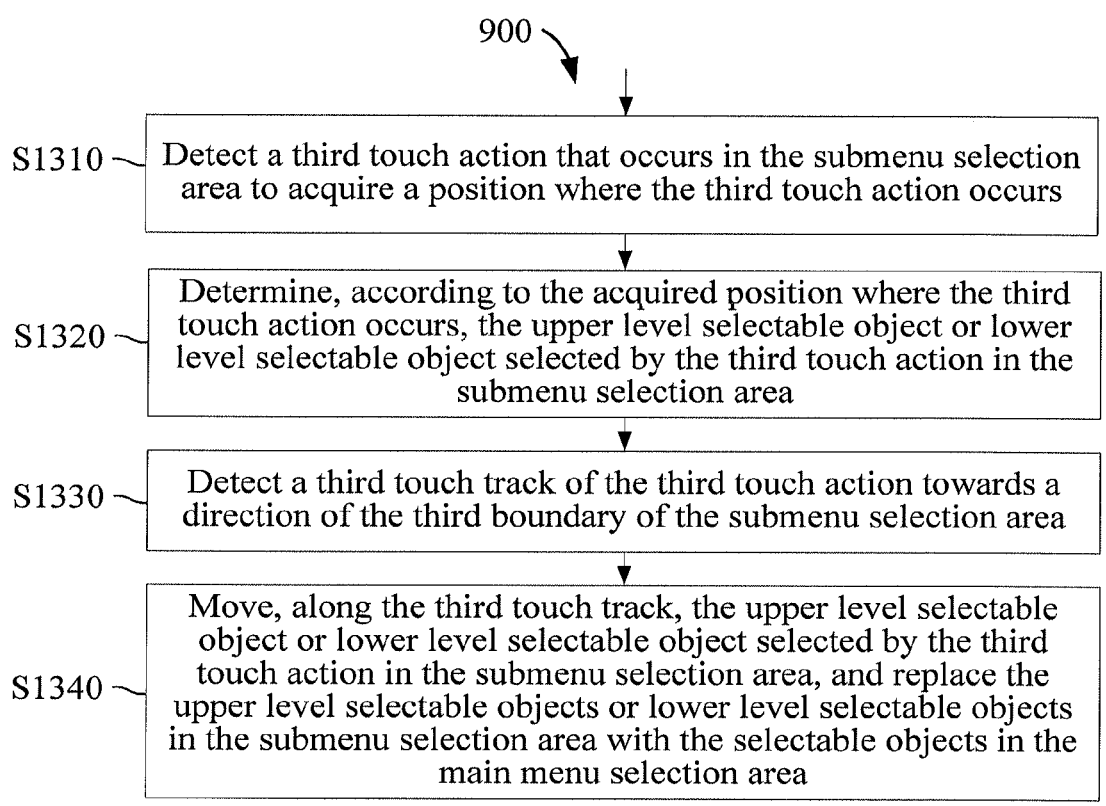

Referring to FIG. 13, in the interaction method 900 provided in the embodiment of the present invention, the third boundary and the second boundary that are generated in step S1010 do not intersect each other in the display area and cross the corner area, respectively, to intersect display boundaries that are at two sides of the corner area, and the second boundary, the third boundary and the display boundaries that are at the two sides of the corner area form the submenu selection area.

Correspondingly, the method 900 further includes the following:

S1310: Detect a third touch action that occurs in the submenu selection area to acquire a position where the third touch action occurs.

S1320: Determine, according to the acquired position where the third touch action occurs, the upper level selectable object or lower level selectable object selected by the third touch action in the submenu selection area.

S1330: Detect a third touch track of the third touch action towards a direction of the third boundary of the submenu selection area.

S1340: Move, along the third touch track, the upper level selectable object or lower level selectable object selected by the third touch action in the submenu selection area, and when the selected upper level selectable object or lower level selectable object crosses over a predetermined position, replace the upper level selectable object or lower level selectable object selected by the second touch action and selectable objects at a same level as the selected upper level selectable object or selected lower level selectable object with the selectable objects in the main menu selection area.

Figure 14:
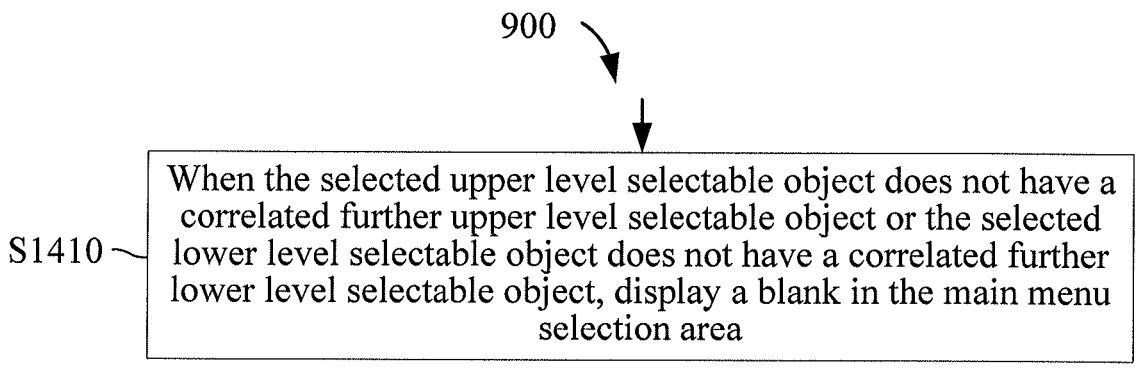

Referring to FIG. 14, in the interaction method 900 provided in the embodiment of the present invention, during the step S1350, that is, the moving, along the third touch track, the upper level selectable object or lower level selectable object correlated to the selectable object in the main menu selection area selected by the third touch action, and replacing the upper level selectable object or lower level selectable object selected by the second touch action and selectable objects at a same level as the selected upper level selectable object or selected lower level selectable object with the selectable objects in the main menu selection area, the method further includes the following:

S1410: When the selected upper level selectable object does not have a correlated further upper level selectable object or the selected lower level selectable object does not have a correlated further lower level selectable object, display a blank in the main menu selection area.

Figure 15:
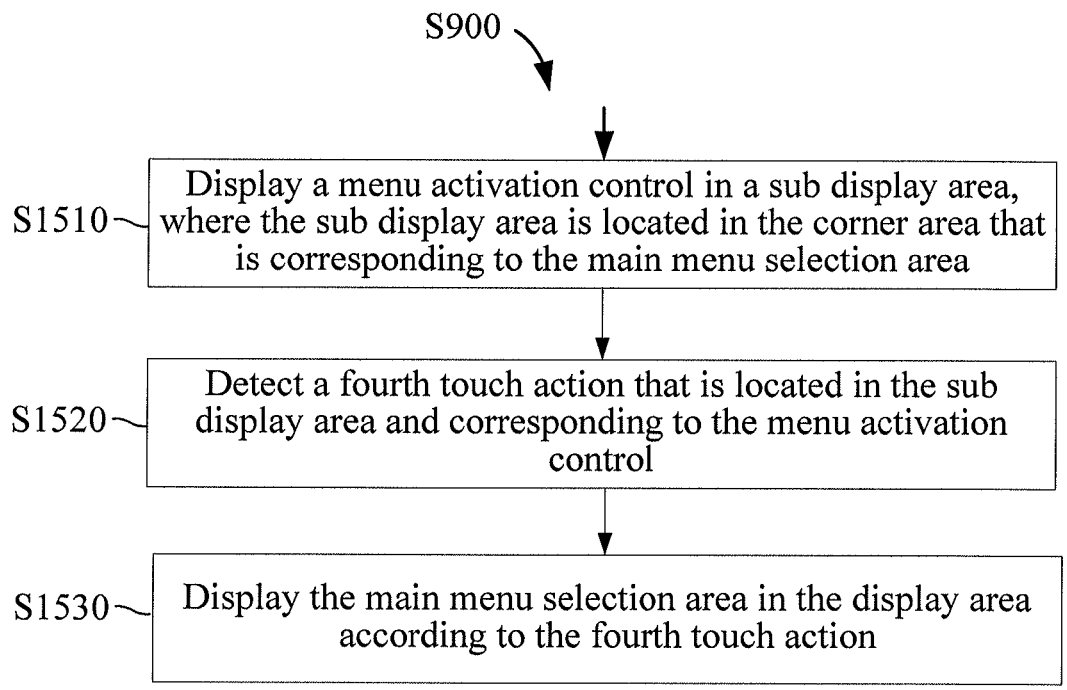

Referring to FIG. 15, the interaction method 900 provided in the embodiment of the present invention further includes the following:

S1510: Display a menu activation control in a sub display area, where the sub display area is located in the corner area corresponding to the main menu selection area;

The menu activation control is generated in the sub display area, and it occupies a small display space, and is used for a user to wake up or activate the concealed main menu selection area, and the display space occupied by the display area is released when unnecessary.

S1520: Detect a fourth touch action that is located in the sub display area and corresponding to the menu activation control.

Correspondingly, step S910 of displaying the main menu selection area in the display area specifically includes the following:

S1530: Display the main menu selection area in the display area according to the fourth touch action.

When the menu activation control is touched, the main menu selection area may be displayed in the display area for the use or operation by a user.

Figure 16:
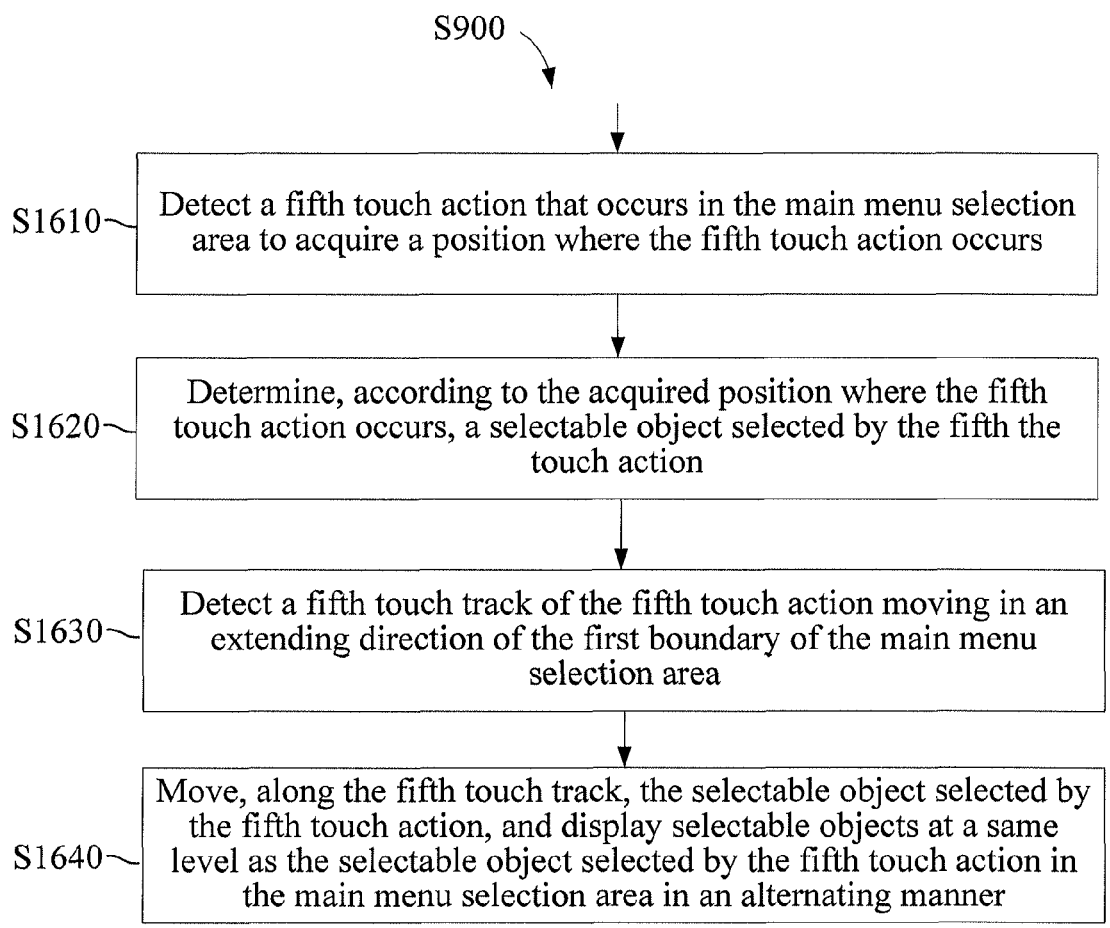

Referring to FIG. 16, the interaction method 900 provided in the embodiment of the present invention further includes the following:

S1610: Detect a fifth touch action that occurs in the main menu selection area to acquire a position where the fifth touch action occurs.

S1620: Determine, according to the acquired position where the fifth touch action occurs, a selectable object selected by the fifth touch action.

S1630: Detect a fifth touch track of the fifth touch action moving in an extending direction of the first boundary of the main menu selection area.

S1640: Move, along the fifth touch track, the selectable object selected by the fifth touch action, and display selectable objects at a same level as the selectable object selected by the fifth touch action in the main menu selection area in an alternating manner.

In addition, it may be understood that, in steps S1610 to S1640 in the foregoing interaction method 900, the submenu selection area may be waked up when the main menu is waked up or after the main menu is waked up.

In the method, the selectable object in the main menu selection area may move in an extending direction of the first boundary of the main menu selection area with the touch operation of the user, thereby presenting multiple selectable objects in the main menu selection area. When a large number of selectable objects exist in the main menu selection area and cannot be displayed in the main menu selection area at the same time, the selectable object currently displayed in the main menu selection area 308 may be slid to display selectable objects that are not displayed yet, so that the user can search for a target object conveniently.

Figure 17:
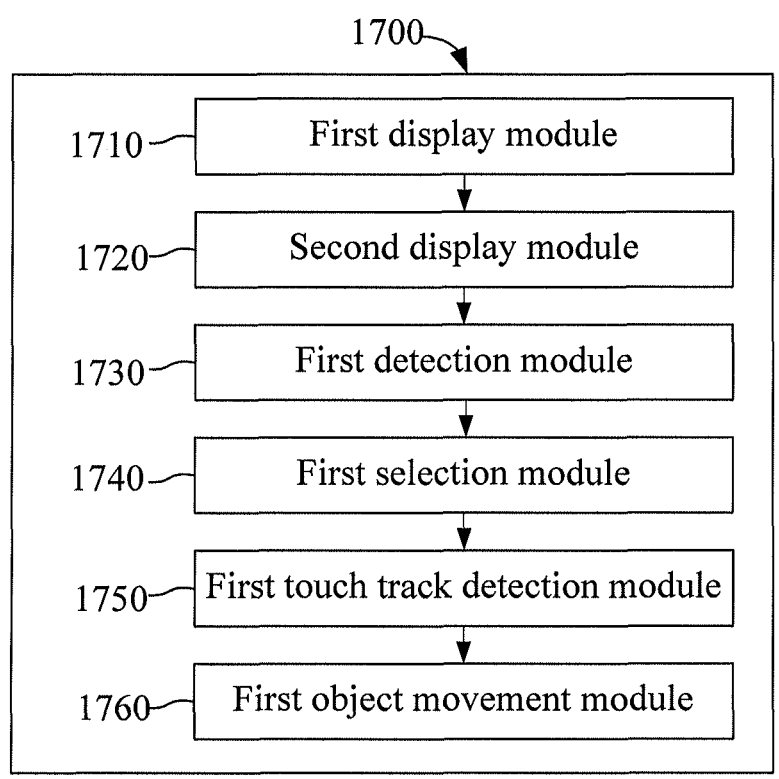
FIG. 17 shows an interaction device according to an embodiment of the present invention.
Figure 18:
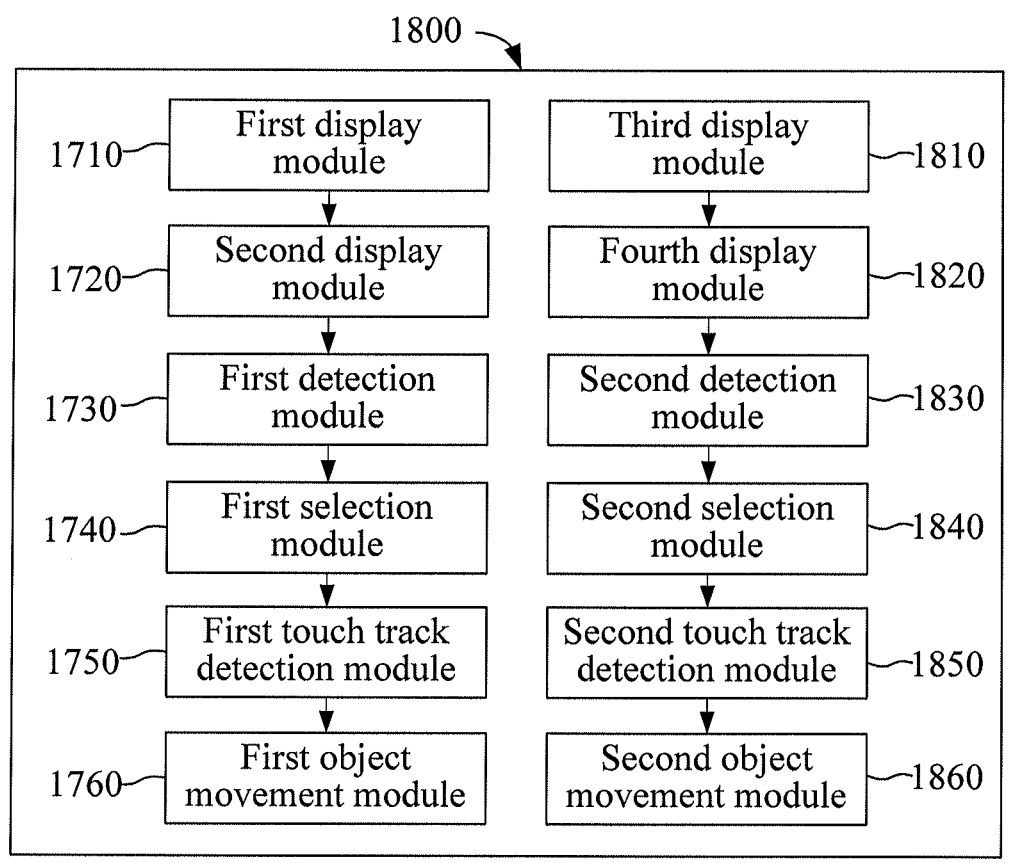
FIG. 18 shows an interaction device according to another embodiment of the present invention.

Referring to FIG. 17, an interaction device 1700 is provided in an embodiment of the present invention, where the interaction device 1700 is used for providing a user with an operable user interface and implementing an interactive operation between the user interface and the user. The interaction device 1700 includes the following:

A first display module 1710 is configured to display two first boundaries in a display area; where the display area includes multiple display boundaries, a corner area is formed between every two adjacent display boundaries, the two first boundaries are located at a position that is corresponding to the at least one corner area in the display area, the two first boundaries do not intersect each other in the display area and cross the corner area, respectively, to intersect display boundaries that are at two sides of the corner area, and the two first boundaries and the display boundaries that are at the two sides of the corner area form a main menu selection area.

The first display module 1710 in the interaction device 1700 is configured to display a main menu in a display area. The main menu and the display area are the same as the main menu and display area generated in step S910 in the interaction method 900 that is provided in the embodiment of the present invention. Correspondingly, for a detailed introduction of the layout manner of the main menu and display area as well as the advantages of the layout manner of the main menu and display area, reference may be made to the introduction of step S910 in the interaction method 900 that is provided in the embodiment of the present invention, which is not repeated here for simplicity. The first display module 1710 is configured to implement step S910 in the interaction method 900, which may refer to the graphical user interface generation program 266, and may also refer to a combination of the graphical user interface generation program 266 and a processor that invokes the graphical user interface generation program 266, or refers to a combination of the graphical user interface generation program 266, the processor that invokes the graphical user interface generation program 266 and various peripheral auxiliary devices.

A second display module 1720 is configured to display selectable objects in the display area, where the selectable objects are located in the main menu selection area in the display area.

The second display module 1720 is configured to implement step S920 in the interaction method 900, which may refer to the graphical user interface generation program 266, and may also refer to a combination of the graphical user interface generation program 266 and a processor that invokes the graphical user interface generation program 266, or refers to a combination of the graphical user interface generation program 266, the processor that invokes the graphical user interface generation program 266 and various peripheral auxiliary devices.

A first detection module 1730 is configured to detect a first touch action that occurs in the main menu selection area to acquire a position where the first touch action occurs.

Through the step, the interaction interface may be generated and the user may implement the interaction with the interaction device that has the interaction interface through the generated interaction interface. In this implementation, the interaction between the user and the interaction device is performed in a touch manner, that is, the generated interaction interface is presented on a touch display screen, and the user may perform interaction with the interaction device through the touch action on the touch display screen. During the interaction, the detection module detects a first touch action that occurs in the main menu selection area to acquire a position where the first touch action occurs, so as to determine a target object corresponding to the first touch action through the position where the first touch action occurs.

A first selection module 1740 is configured to determine, according to the acquired position where the first touch action occurs, a selectable object selected by the first touch action.

After acquiring the specific position where first touch action occurs, the first detection module 1730 feeds back the specific position to the processor of the interaction device, and the first selection module 1740 of the interaction device determines, according to the position where the touch action occurs and model data of the interaction interface, a target object, that is, a selectable object corresponding to the corresponding specific position where the first touch action occurs. After the selectable object is determined, the first selection module 1740 may prompt the selection of a selectable object in a visual, acoustic or tact prompt manner, for example, by enlarging the selected selectable object, or making a sound that represents the selection, or in a manner of vibration of the interaction device to indicate that the target object is selected.

A first touch track detection module 1750 is configured to detect a first touch track of the first touch action towards a direction of any one of the first boundaries of the main menu selection area.

A first object movement module 1760 is configured to move, along the first touch track, the selectable object selected by the first touch action, and when the selectable object selected by the first touch action crosses over a predetermined position, replace the selectable object selected by the first touch action and predetermined selectable objects at a same level as the selected selectable object with predetermined upper level selectable objects or lower level selectable objects correlated to the selected selectable object.

After selecting a selectable object according to the first touch action detected by the first detection module 1730, the first selection module 1740 may acquire upper level selectable objects or lower level selectable objects correlated to the selectable object according to a subsequent movement action of the user. For convenience of the operations of the user and to meet the ergonomic design, in the implementation of the present invention, a slide action towards a direction of one random first boundary of the menu selection area is used as a trigger instruction for triggering or acquiring upper level selectable objects or lower level selectable objects correlated to the selected selectable object, that is, after the first selection module 1740 selects one selectable object, the first touch track detection module 1750 continues determining a touch track of the first touch action, and feeds back the acquired touch track to the first object movement module 1760, and the first object movement module 1760 moves the selected selectable object according to the touch track of the first touch action detected by the first touch track detection module 1750. When the touch track of the first touch action is towards a direction of the first boundary of the main menu selection area and a span of the movement track in the display area meets a predetermined rule or threshold value, the object movement module sends an instruction of changing the selectable object, that is, replacing the selectable object selected by the first touch action and selectable object at a same level as the selected selectable object with upper level selectable objects or lower level selectable objects correlated to the selected selectable object.

In the interaction device provided in the embodiment of the present invention, by providing a user with an interaction interface that meets the ergonomics and is easy to operate, the user may browse and select a target object conveniently and rapidly through a touch operation, so as to simplify the interaction process, enhance the interaction efficiency, and reduce the physical fatigue of the user in the interaction process.

Referring to FIG. 8, another interaction device 1800 is provided in an embodiment of the present invention, and on the basis of the interaction device 1700, the interaction device 1800 further includes the following:

A third display module 1810 is configured to display a second boundary and a third boundary in the display area, where the second boundary and the third boundary are located outside the main menu selection area and the third boundary is farther away from the main menu selection area than the second boundary is; and the second boundary and the third boundary form a submenu selection area.

To make it convenient for a user to further learn or view the practical architecture of a system or file of a target object more explicitly and make the interaction between the user and the interaction device smoother, on the basis of the interaction interface provided by the interaction apparatus 1700 that is provided in the embodiment of the present invention, the third display module 1810 further generates an interaction interface that includes a submenu selection area 402. The interaction interface is the same as the interaction interface 400 presented in FIG. 4 of the embodiment of the present invention, that is, a submenu selection area 402 is generated near the main menu selection area 308. The submenu selection area 402 includes a second boundary 404 and a third boundary 405 that are adjacent to a first boundary 310 of the main menu selection area 308. In the embodiment of the present invention, the submenu selection area generated by the third display module 1810 may be used to further display the target object in the submenu selection area 402, so as to present more information of the target object to the user, and at the same time explicitly present to the user the specific level architecture of the system or file of the target object, so that the user can search for a desired target object conveniently and rapidly.

A fourth display module 1820 is configured to display upper level selectable objects or lower level selectable objects correlated to the selectable object in the main menu selection area, and the upper level selectable objects or lower level selectable objects correlated to the selectable object in the main menu selection area are located in the submenu selection area.

Through the fourth display module 1820, the upper level selectable objects or lower level selectable objects correlated to the selectable object are displayed in the submenu selection area, which may provide the user with more information of the selectable object.

A second detection module 1830 is configured to detect a second touch action that occurs in the submenu selection area to acquire a position where the second touch action occurs.

After the interaction interface is generated through the third display module 1810 and fourth display module 1820, the user may implement the interaction access to the interaction device through the generated interaction interface. In this implementation, the interaction access between the user and the interaction device is implemented in a touch manner, that is, the generated interaction interface is presented on a touch display screen, and the user may perform interaction with the interaction device through the touch action on the touch display screen. During the interaction, the second detection module 1830 detects a second touch action that occurs in the main menu selection area to acquire a position where the second touch action occurs, so as to determine a target object corresponding to the second touch action through the position where the second touch action occurs.

A second selection module 1840 is configured to determine, according to the acquired position where the second touch action occurs, upper level selectable objects or lower level selectable objects correlated to the selectable object in the main menu selection area selected by the second touch action.

After detecting the specific position where the second touch action occurs, the second detection module 1830 feeds back the specific position to the second selection module of the interaction device, and the second selection module 1840 of the interaction device determines, according to the position where the touch action occurs and the model data of the interaction interface, a target object corresponding to the corresponding specific position where the second touch action occurs. After the selectable object serving as the target object is determined, the second selection module 1840 may prompt selection of a selectable object in a visual, acoustic or tact prompt manner, for example, by enlarging the selected selectable object, or making a sound that represents selection, or in a manner of vibration of the interaction device to indicate that the target object is selected.

The second track detection module 1850 is configured to detect a second touch track of the second touch action towards a direction of the second boundary of the submenu selection area.

The second object movement module 1860 is configured to move, along the second touch track, the upper level selectable object or lower level selectable object selected by the second touch action, and when the upper level selectable object or lower level selectable object selected by the second touch action crosses over a predetermined position, replace the selectable objects in the main menu selection area with the upper level selectable object or lower level selectable object selected by the second touch action and selectable objects at a same level as the selected upper level selectable object or selected lower level selectable object.

After selecting the upper level selectable object or lower level selectable object correlated to the selectable object through the second touch action detected by the second detection module 1830, the second selection module 1840 may acquire further upper level selectable objects or further lower level selectable objects correlated to the upper level selectable object or lower level selectable object correlated to the selectable object according to a second touch track of the second touch action detected by the second track detection module 1850. For convenience of the operations of the user and to meet the ergonomic design, in the implementation of the present invention, a slide action towards a direction of one random second boundary of the submenu selection area is used as a trigger instruction for triggering or acquiring further upper level selectable objects or further lower level selectable objects correlated to the upper level selectable object or lower level selectable object correlated to the selectable object, that is, after the second selection module 1840 selects the further upper level selectable objects or further lower level selectable objects correlated to the upper level selectable object or lower level selectable object correlated to the selectable object according to the second touch action detected by the second detection module 1830, the second track detection module 1850 detects a touch track of the second touch action and feeds back the acquired touch track to the second object movement module 1860. The second object movement module 1860 moves the selected further upper level selectable object or further lower level selectable object according to the touch track of the second touch action. When the touch track of the second touch action is towards the direction of the second boundary of the submenu selection area and a span of the movement track in the display area meets a predetermined rule or threshold value, the second object movement module 1860 sends an instruction of changing selectable objects, that is, replacing the selectable objects in the main menu selection area with the upper level selectable object or lower level selectable object selected by the second selection module 1840 and selectable objects at a same level as the selected upper level selectable object or selected lower level selectable object.

In the interaction device provided in the embodiment of the present invention, by providing a user with an interaction interface that meets the ergonomics and is easy to operate, the user is enabled to browse and select a target object conveniently and rapidly through a touch operation, so as to simplify the interaction process, enhance the interaction efficiency, and reduce the physical fatigue of the user in the interaction process.

Further, on the basis of the interaction device 1800 provided in the embodiment of the present invention, when the second object movement module 1860 replaces the selectable objects in the main menu selection area with the upper level selectable object or lower level selectable object selected by the second touch action and selectable objects at a same level as the selected upper level selectable object or selected lower level selectable object, the second display module 1810 is further configured to display further upper level selectable objects correlated to the selected upper level selectable object or further lower level selectable objects correlated to the selected lower level selectable object in the submenu selection area.

Further, on the basis of the interaction device 1800 provided in the embodiment of the present invention, the first movement track detection module 1750 is specifically configured to detect the first touch track of the first touch action towards a direction of the first boundary of the main menu selection area adjacent to the second boundary of the submenu.

The second display module 1720 is further configured to replace the upper level selectable objects or lower level selectable objects in the submenu selection area with the selectable objects in the main menu selection area.

Further, on the basis of the interaction device 1800 provided in the embodiment of the present invention, the third boundary and the second boundary that are generated by the second display module 1810 do not intersect each other in the display area and cross the corner area, respectively, to intersect display boundaries that are at two sides of the corner area, and the second boundary, the third boundary and the display boundaries that are at the two sides of the corner area form the submenu selection area.

Correspondingly, the second detection module 1830 of the interaction device 1800 is further configured to detect a third touch action that occurs in the submenu selection area to acquire a position where the third touch action occurs.

The second selection module 1840 of the interaction device 1800 is further configured to determine, according to the acquired position where the third touch action occurs, the upper level selectable object or lower level selectable object selected by the third touch action in the submenu selection area.

The second track detection module 1850 is further configured to detect a third touch track of the third touch action towards a direction of the third boundary of the submenu selection area.

The second object movement module 1860 is further configured to move, along the third touch track, the upper level selectable object or lower level selectable object in the submenu selection area selected by the third touch action, and when the selected upper level selectable object or lower level selectable object crosses over a predetermined position, replace the upper level selectable object or lower level selectable object selected by the second touch action and selectable objects at a same level as the selected upper level selectable object or selected lower level selectable object with the selectable objects in the main menu selection area.

Further, on the basis of the interaction device 1800 provided in the embodiment of the present invention, when the second object movement module 1860 moves, along the third touch track, the upper level selectable object or lower level selectable object correlated to the selectable object in the main menu selection area selected by the third touch action, and replaces the upper level selectable object or lower level selectable object selected by the second touch action and selectable objects at a same level as the selected upper level selectable object or selected lower level selectable object with the selectable objects in the main menu selection area, the second display module 1720 is further configured to, when the selected upper level selectable object does not have a correlated further upper level selectable object or the selected lower level selectable object does not have a correlated further lower level selectable object, display a blank in the main menu selection area.

Figure 19:
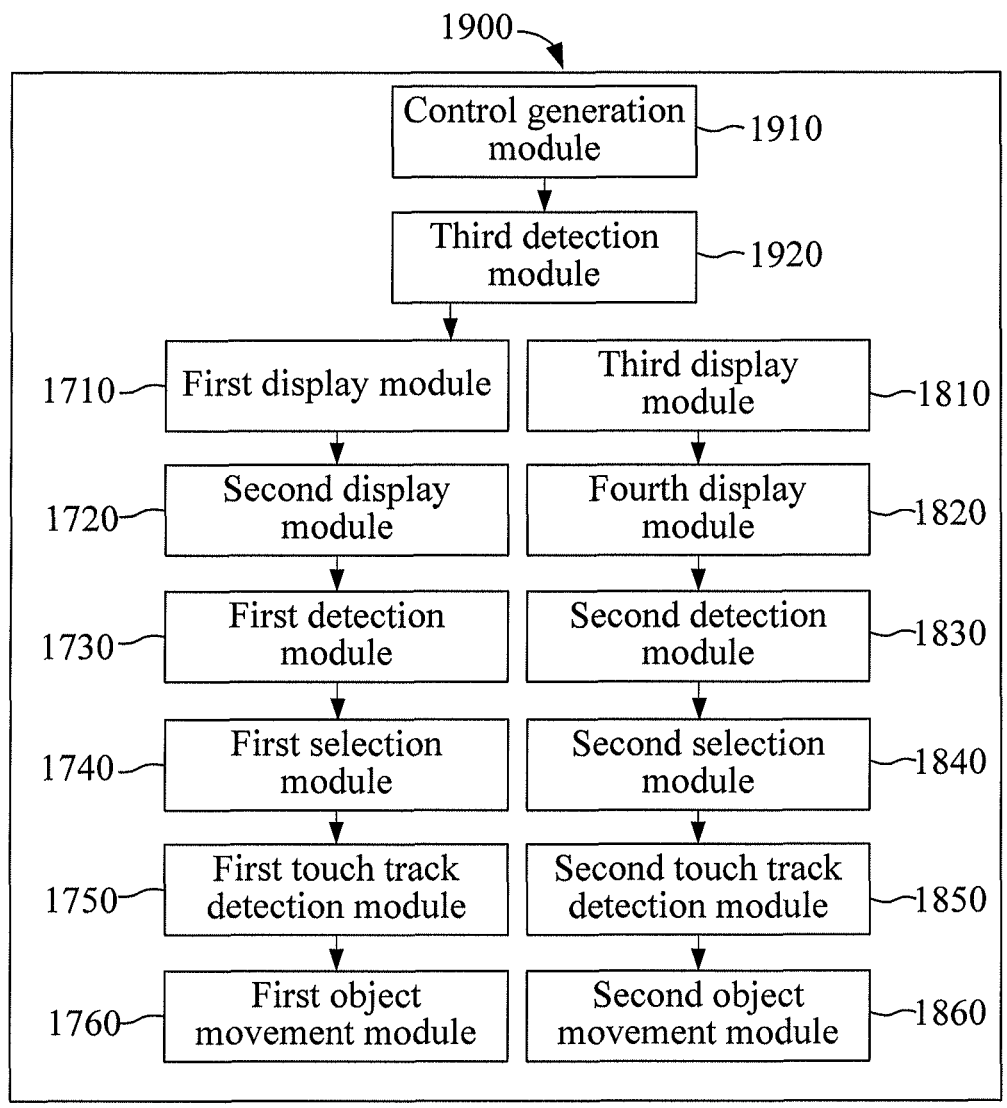
FIG. 19 shows an interaction device according to another embodiment of the present invention.

Referring to FIG. 19, the interaction device 1900 is provided in the embodiment of the present invention, on the basis of the interaction device 1800, the interaction device 1900 further includes the following:

A control generation module 1910 is configured to display a menu activation control in a sub display area, where the sub display area is located at a corresponding corner area in the main menu selection area.

The control generation module 1910 is configured to generate a menu activation control in the sub display area, where the menu activation control occupies a small display space and is used for a user to wake up or activate the concealed main menu selection area, and the display space occupied by the display area is released when unnecessary.

A third detection module 1920 is configured to detect a fourth touch action that is located in the sub display area and corresponding to the menu activation control.

Correspondingly, the first display module 1710 is further configured to display the main menu selection area in the display area according to the fourth touch action.

When the menu activation control is touched, the main menu selection area may be displayed in the display area for use or operations by the user.

Further, on the basis of the interaction devices 1700, 1800, and 1900 that are provided in the embodiments of the present invention, the first detection module 1730 is further configured to detect a fifth touch action that occurs in the main menu selection area to acquire a position where the fifth touch action occurs.

Correspondingly, the first selection module 1740 is further configured to determine, according to the acquired position where the fifth touch action occurs, a selectable object selected by the fifth touch action.

The first track detection module 1750 is further configured to detect a fifth touch track of the fifth touch action moving in an extending direction of the first boundary of the main menu selection area.

The first object movement module 1760 is further configured to move, along the fifth touch track, the selectable object selected by the fifth touch action, and display selectable objects at a same level as the selectable object selected by the fifth touch action in the main menu selection area in an alternating manner.

In addition, it may be understood that, the control generation module 1910 may also wake up the submenu selection area when waking up the main menu or after waking up the main menu in a similar manner.

In this embodiment, the selectable object in the main menu selection area may move in the extending direction of the first boundary of the main menu selection area under the touch operation of the user, so that multiple selectable objects are presented in the main menu selection area. When a large number of selectable objects exist in the main menu selection area and cannot be displayed in the main menu selection area at the same time, the selectable object currently displayed in the main menu selection area 308 may be slid to display the selectable objects that are not displayed yet, so that the user can search for a target object conveniently. Through the foregoing description of the implementation, persons skilled in the art may clearly understand that, the present invention may be implemented by software on a necessary universal hardware platform, and definitely may also be implemented by hardware, but in most cases, the present invention is preferably implemented through the former method. Based on such understanding, the foregoing technical solution of the present invention or the part that makes contributions to the prior art may be substantially embodied in the form of a software product. The computer software product may be stored in a readable storage medium such as a floppy disk, a hard disk or an optical disk, and includes a number of 1 instructions that cause a computer equipment (for example, a personal computer, a server, or a network equipment) to perform the method according to the embodiments of the present invention.

Finally, it should be noted that, the above embodiments are merely provided for describing the technical solutions of the present invention, but not intended to limit the present invention. It should be understood by persons of ordinary skill in the art that, although the present invention has been described in detail with reference to the embodiments, modifications can be made to the technical solutions described in the embodiments, or equivalent replacements can be made to some technical features in the technical solutions, and such modifications and replacements do not cause the essences of corresponding technical solutions to depart from the spirit and scope of the embodiments of present invention.

What is claimed is:

1. An interaction device, comprising a touch-sensitive display having an interaction interface, wherein the interaction interface comprises a display area formed of multiple display boundaries, and among the multiple display boundaries, a corner area is formed between every two adjacent display boundaries, and the interaction device further comprises an interface interaction unit and a processing unit wherein the interface interaction unit and the processing unit comprises a processor and memory storing instructions that are executed on the processor such that:

the interface interaction unit generates two first boundaries at a position that is corresponding to at least one corner area in the display area; the two first boundaries do not intersect each other in the display area and cross the corner area, respectively, to intersect display boundaries that are at two sides of the corner area; the two first boundaries and the display boundaries that are at the two sides of the corner area form a main menu selection area; the main menu selection area comprises a selectable object; and the processing unit, when the selectable object in the main menu selection area is selected and moves towards a position where any one of the two first boundaries is located and the selected selectable object crosses over a predetermined position wherein the predetermined position is associated with at least one of the two first boundaries, replaces, upon the predetermined position associating with the at least one of the two first boundaries being crossed by a movement of the selected selectable object, the selected selectable object and a predetermined selectable object at a same level as the selected selectable object in the main menu selection area with predetermined upper level selectable objects or lower level selectable objects correlated to the selected selectable object.

2. The interaction device according to claim 1, wherein: the interface interaction unit forms a second boundary and a third boundary in the display area outside the main menu selection area and adjacent to the main menu selection area; the second boundary and the third boundary form a submenu selection area; the third boundary is farther away from the main menu selection area than the second boundary is; the submenu selection area comprises the predetermined upper level selectable objects or lower level selectable objects correlated to the selected selectable object; and the processing unit, when the upper level selectable object or lower level selectable object in the submenu selection area is selected and moves towards a position where the second boundary of the submenu selection area is located and the selected upper level selectable object or lower level selectable object crosses over a predetermined position, replaces the selectable objects in the main menu selection area with the selected upper level selectable objects or lower level selectable objects.

3. The interaction device according to claim 2, wherein when the processing unit replaces the selectable objects in the main menu selection area with the selected upper level selectable objects or lower level selectable objects, the interface interaction unit displays further upper level selectable objects correlated to the selected upper level selectable object or further lower level selectable objects correlated to the selected lower level selectable object in the submenu selection area.

4. The interaction device according to claim 2, wherein the processing unit, when the selectable object in the main menu selection area is selected and moves towards the first boundary that is adjacent to the second boundary of the submenu selection area and the selected selectable object crosses over a predetermined position, replaces the upper level selectable objects or lower level selectable objects correlated to the selected selectable object in the submenu selection area with the selectable objects in the main menu selection area.

5. The interaction device according to claim 2, wherein the third boundary and the second boundary do not intersect each other in the display area and cross the corner area, respectively, to intersect display boundaries that are at two sides of the corner area, and the second boundary, the third boundary and the display boundaries that are at the two sides of the corner area form the submenu selection area; and correspondingly, the processing unit, when the upper level selectable object or lower level selectable object in the submenu selection area is selected and moves towards a position where the third boundary is located and the selected upper level selectable object or lower level selectable object crosses over a predetermined position, replaces the upper level selectable objects or the lower level selectable objects in the submenu selection area with the selectable objects in the main menu selection area.

6. The interaction device according to claim 2, wherein the display area is a rectangle comprising four display boundaries, and the main menu selection area is formed at a lower right corner or a lower left corner of the display area for a user to perform an operation on the selectable objects in the main menu with a thumb.

7. The interaction device according to claim 1, wherein at least one of the first boundary, the second boundary and the third boundary is in an arc shape.

8. The interaction device according to claim 1, wherein the interface interaction unit generates a sub display area in a corner area that is corresponding to the main menu selection area, wherein the sub display area comprises a menu activation control; and the processing unit activates the main menu selection area in the display area when the menu activation control is selected.

9. The interaction device according to claim 1, wherein: the interface interaction unit comprises a touch sensing interface; the touch sensing interface responds to a touch action that occurs on the interaction interface; the touch action comprises a tap for selecting the selectable objects in the display area; a slide for moving the selected selectable object; and the processing unit executes corresponding interface interaction processing according to a response of the touch sensing interface.

10. The interaction device according to claim 1, wherein the processing unit, after the selectable object in the main menu selection area is selected and moves in an extending direction of the first boundary of the main menu selection area, alternately displays the predetermined selectable objects at the same level as the selected selectable object in the main menu selection area.

11. An interaction method of an interaction device, comprising:

displaying two first boundaries in a display area, wherein the display area comprises multiple display boundaries, a corner area is formed between every two adjacent display boundaries, the two first boundaries are located at a position that is corresponding to the at least one corner area in the display area, the two first boundaries do not intersect each other in the display area and cross the corner area, respectively, to intersect display boundaries that are at two sides of the corner area, and the two first boundaries and the display boundaries that are at the two sides of the corner area form a main menu selection area;

displaying selectable objects in the display area, wherein the selectable objects are located in the main menu selection area in the display area; detecting a first touch action that occurs in the main menu selection area to acquire a position where the first touch action occurs;

determining, according to the acquired position where the first touch action occurs, a selectable object selected by the first touch action;

detecting a first touch track of the first touch action towards a direction of any one of the first boundaries of the main menu selection area; and moving, along the first touch track, the selectable object selected by the first touch action, and when the selectable object selected by the first touch action crosses over a predetermined position wherein the predetermined position is associated with at least one of the two first boundaries, replacing, upon the predetermined position associating with the at least one of the two first boundaries being crossed by a movement of the selected selectable object, the selectable object selected by the first touch action and a predetermined selectable object at a same level as the selected selectable object with predetermined upper level selectable objects or lower level selectable objects correlated to the selected selectable object.

12. The interaction method according to claim 11, wherein the method further comprises:

displaying a second boundary and a third boundary in the display area, wherein the second boundary and the third boundary are located outside the main menu selection area and the third boundary is farther away from the main menu selection area than the second boundary is; and the second boundary and the third boundary form a submenu selection area;

displaying the predetermined upper level selectable objects or lower level selectable objects correlated to the selected selectable object, wherein the predetermined upper level selectable objects or predetermined lower level selectable objects correlated to the selected selectable object are located in the submenu selection area;

detecting a second touch action that occurs in the submenu selection area to acquire a position where the second touch action occurs;

determining, according to the acquired position where the second touch action occurs, the upper level selectable object or lower level selectable object selected by the second touch action;

detecting a second touch track of the second touch action towards a direction where the second boundary of the submenu selection area is located; and moving, along the second touch track, the upper level selectable object or lower level selectable object selected by the second touch action, and when the upper level selectable object or lower level selectable object selected by the second touch action crosses over a predetermined position, replacing the selectable objects in the main menu selection area with the upper level selectable object or lower level selectable object selected by the second touch action and selectable objects at a same level as the selected upper level selectable object or selected lower level selectable object.

13. The interaction method according to claim 12, wherein when replacing the selectable objects in the main menu selection area with the upper level selectable object or lower level selectable object selected by the second touch action and selectable objects at a same level as the selected upper level selectable object or selected lower level selectable object, the method further comprises:

displaying further upper level selectable objects correlated to the selected upper level selectable object or further lower level selectable objects correlated to the selected lower level selectable object in the submenu selection area.

14. The interaction method according to claim 12, wherein the detecting the first touch track of the first touch action in the direction of one random first boundary of the main menu selection area specifically comprises:
    detecting the first touch track of the first touch action towards a direction of the first boundary of the main menu selection area adjacent to the second boundary of the submenu; and
    correspondingly, when replacing the selectable object selected by the first touch action and the predetermined selectable objects at the same level as the selected selectable object with the predetermined upper level selectable objects or lower level selectable objects correlated to the selected selectable object, the method further comprises:
    replacing the upper level selectable objects or lower level selectable objects in the submenu selection area with the selectable objects in the main menu selection area.

15. The interaction method according to claim 12, wherein the third boundary and the second boundary do not intersect each other in the display area and cross the corner area, respectively, to intersect display boundaries that are at two sides of the corner area, and the second boundary, the third boundary and the display boundaries that are at the two sides of the corner area form the submenu selection area; and
    correspondingly, the method further comprises:
    detecting a third touch action that occurs in the submenu selection area to acquire a position where the third touch action occurs;
    determining, according to the acquired position where the third touch action occurs, the upper level selectable object or lower level selectable object selected by the third touch action in the submenu selection area;
    detecting a third touch track of the third touch action towards a direction of the third boundary of the submenu selection area; and
    moving, along the third touch track, the upper level selectable object or lower level selectable object selected by the third touch action in the submenu selection area, and when the selected upper level selectable object or lower level selectable object crosses over a predetermined position, replacing the upper level selectable object or lower level selectable object selected by the second touch action and selectable objects at a same level as the selected upper level selectable object or selected lower level selectable object with the selectable objects in the main menu selection area.

16. The interaction method according to claim 11, wherein the method further comprises:
    displaying a menu activation control in a sub display area, wherein the sub display area is located in the corner area that is corresponding to the main menu selection area; and
    detecting a fourth touch action that is located in the sub display area and corresponding to the menu activation control; wherein
    correspondingly, the displaying the main menu selection area in the display area specifically comprises:
    displaying the main menu selection area in the display area according to the fourth touch action.

17. The interaction method according to claim 11, wherein the method further comprises:

detecting a fifth touch action that occurs in the main menu selection area to acquire a position where the fifth touch action occurs;
    determining, according to the acquired position where the fifth touch action occurs, a selectable object selected by the fifth touch action;
    detecting a fifth touch track of the fifth touch action moving along an extending direction of the first boundary of the main menu selection area; and
    moving, along the fifth touch track, the selectable object selected by the fifth touch action, and displaying selectable objects at a same level as the selectable object selected by the fifth touch action in the main menu selection area in an alternating manner.

18. An interaction device having a touch-sensitive display, comprising:
    a first display module having a number of instructions that cause a computer equipment to display two first boundaries in a display area; wherein the display area comprises multiple display boundaries, a corner area is formed between every two adjacent display boundaries, the two first boundaries are located at a position that is corresponding to the at least one corner area in the display area, the two first boundaries do not intersect each other in the display area and cross the corner area, respectively, to intersect display boundaries that are at two sides of the corner area, and the two first boundaries and the display boundaries that are at the two sides of the corner area form a main menu selection area;
    a second display module having a number of instructions that cause a computer equipment to display selectable objects in the display area, wherein the selectable objects are located in the main menu selection area in the display area;
    a first detection module having a number of instructions that cause a computer equipment to detect a first touch action that occurs in the main menu selection area to acquire a position where the first touch action occurs;
    a first selection module having a number of instructions that cause a computer equipment to determine, according to the acquired position where the first touch action occurs, a selectable object selected by the first touch action;
    a first touch track detection module having a number of instructions that cause a computer equipment to detect a first touch track of the first touch action towards a direction of any one of the first boundaries of the main menu selection area, and
    a first object movement module having a number of instructions that cause a computer equipment to move, along the first touch track, the selectable object selected by the first touch action, and when the selectable object selected by the first touch action crosses over a predetermined position wherein the predetermined position is associated with at least one of the two first boundaries, replace, upon the predetermined position associating with the at least one of the two first boundaries being crossed by a movement of the selected selectable object, the selectable object selected by the first touch action and predetermined selectable objects at a same level as the selected selectable object with predetermined upper level selectable objects or lower level selectable objects correlated to the selected selectable object.

19. The interaction device according to claim 18, further comprising:
    a third display module having a number of instructions that cause a computer equipment to display a second boundary and a third boundary in the display area, wherein the second boundary and the third boundary are located outside the main menu selection area and the third boundary is farther away from the main menu selection area than the second boundary is; and the second boundary and the third boundary form a submenu selection area;

a fourth display module having a number of instructions that cause a computer equipment to display the predetermined upper level selectable objects or lower level selectable objects correlated to the selected selectable object, wherein the predetermined upper level selectable objects or predetermined lower level selectable objects correlated to the selected selectable object are located in the submenu selection area;

a second detection module having a number of instructions that cause a computer equipment to detect a second touch action that occurs in the submenu selection area to acquire a position where the second touch action occurs;

a second selection module having a number of instructions that cause a computer equipment to determine, according to the acquired position where the second touch action occurs, the upper level selectable object or lower level selectable object selected by the second touch action in the menu selection area;

a second track detection module having a number of instructions that cause a computer equipment to detect a second touch track of the second touch action towards a direction of the second boundary of the submenu selection area; and a second object movement module having a number of instructions that cause a computer equipment to move, along the second touch track, the upper level selectable object or lower level selectable object selected by the second touch action, and when the upper level selectable object or lower level selectable object selected by the second touch action crosses over a predetermined position, replace the selectable objects in the main menu selection area with the upper level selectable object or lower level selectable object selected by the second touch action and selectable objects at a same level as the selected upper level selectable object or selected lower level selectable object.

20. The interaction device according to claim 19, wherein when the second object movement module replaces the selectable objects in the main menu selection area with the upper level selectable object or lower level selectable object selected by the second touch action and selectable objects at a same level as the selected upper level selectable object or selected lower level selectable object;

the second display module displays further upper level selectable objects correlated to the selected upper level selectable object or further lower level selectable objects correlated to the selected lower level selectable object in the submenu selection area.

21. The interaction device according to claim 20, wherein, the first movement track detection module detects the first touch track of the first touch action towards a direction of the first boundary of the main menu selection area adjacent to the second boundary of the submenu;

and correspondingly, the second display module replaces the upper level selectable objects or lower level selectable objects in the submenu selection area with the selectable objects in the main menu selection area.

22. The interaction device according to claim 19, wherein the third boundary and the second boundary do not intersect each other in the display area and cross the corner area, respectively, to intersect display boundaries that are at two sides of the corner area, and the second boundary, the third boundary and the display boundaries that are at the two sides of the corner area form the submenu selection area;

the second detection module detects a third touch action that occurs in the submenu selection area to acquire a position where the third touch action occurs;

the second selection module determines, according to the acquired position where the third touch action occurs, the upper level selectable object or lower level selectable object selected by the third touch action in the submenu selection area;

the second track detection module detects a third touch track of the third touch action towards a direction of the third boundary of the submenu selection area; and the second object movement module, moves, along the third touch track, the upper level selectable object or lower level selectable object selected by the third touch action in the submenu selection area, and when the selected upper level selectable object or lower level selectable object crosses over a predetermined position, replaces the upper level selectable object or lower level selectable object selected by the second touch action and selectable objects at a same level as the selected upper level selectable object or selected lower level selectable object with the selectable objects in the main menu selection area.

23. The interaction device according to of claim 19, wherein the interaction device further comprises:

a control generation module having a number of instructions that cause a computer equipment to display a menu activation control in a sub display area, wherein the sub display area is located in the corner area that is corresponding to the main menu selection area;

a third detection module having a number of instructions that cause a computer equipment to detect a fourth touch action that is located in the sub display area and corresponding to the menu activation control; and correspondingly, the first display module displays the main menu selection area in the display area according to the fourth touch action.

24. The interaction device according to of claim 19, wherein, the first detection module detects a fifth touch action that occurs in the main menu selection area to acquire a position where the fifth touch action occurs;

correspondingly, the first selection module determines, according to the acquired position where the fifth touch action occurs, a selectable object selected by the fifth touch action;

the first track detection module detects a fifth touch track of the fifth touch action moving along an extending direction of the first boundary of the main menu selection area; and the first object movement module moves, along the fifth touch track, the selectable object selected by the fifth touch action, and displays selectable objects at a same level as the selectable object selected by the fifth touch action in an alternating manner in the main menu selection area.

* * * * *